(12) United States Patent
Raghavan et al.

(10) Patent No.: US 12,323,960 B2
(45) Date of Patent: Jun. 3, 2025

(54) DYNAMIC QUASI CO-LOCATION MAPPING FOR MULTIPLE LINKS WITH ASSISTIVE COMMUNICATION NODES

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 536 days.

(21) Appl. No.: 17/468,976

(22) Filed: Sep. 8, 2021

(65) Prior Publication Data
US 2023/0073398 A1    Mar. 9, 2023

(51) Int. Cl.
*H04W 72/044* (2023.01)
*H04L 5/00* (2006.01)

(52) U.S. Cl.
CPC ......... *H04W 72/046* (2013.01); *H04L 5/0048* (2013.01)

(58) Field of Classification Search
CPC .... H04W 72/046; H04L 5/0048; H04B 7/026; H04B 7/04013; H04B 7/088; H04B 7/1555; H04B 7/0695; H04B 7/06952; H04B 7/06954; H04B 7/06956; H04B 7/06958; H04B 7/0696; H04B 7/06962; H04B 7/06964; H04B 7/06966; H04B 7/06968
See application file for complete search history.

(56) References Cited

U.S. PATENT DOCUMENTS

| | | | |
|---|---|---|---|
| 2019/0020402 A1 | 1/2019 | Gharavi et al. | |
| 2020/0119821 A1* | 4/2020 | Qin | H04W 24/08 |
| 2020/0280365 A1* | 9/2020 | Abedini | H04W 52/42 |
| 2020/0337000 A1* | 10/2020 | Kim | H04L 43/0864 |
| 2021/0068050 A1 | 3/2021 | Sampath et al. | |
| 2021/0126694 A1 | 4/2021 | Abedini et al. | |
| 2021/0176670 A1* | 6/2021 | Keskitalo | H04L 5/0048 |
| 2021/0288698 A1* | 9/2021 | Chen | H04B 7/0617 |
| 2022/0210843 A1* | 6/2022 | Lee | H04W 24/10 |
| 2022/0393756 A1* | 12/2022 | Matsumura | H04B 7/15514 |
| 2022/0408277 A1* | 12/2022 | Yang | H04W 16/28 |
| 2023/0136962 A1* | 5/2023 | Jiang | H04B 7/04013 370/329 |

FOREIGN PATENT DOCUMENTS

WO    WO-2019047808 A1    3/2019

OTHER PUBLICATIONS

International Search Report and Written Opinion—PCT/US2022/037376—ISA/EPO—Oct. 17, 2022 (2105340WO).

* cited by examiner

*Primary Examiner* — Sun Jong Kim
(74) *Attorney, Agent, or Firm* — Holland & Hart LLP

(57) ABSTRACT

Methods, systems, and devices for wireless communications are described. A first wireless device may transmit signaling to an assistive node, and the assistive node may retransmit the signaling to a second wireless device. The assistive node may be configured with a mapping between receive beams and transmit beams at the assistive node. The mapping may enable the assistive node to receive signaling using a receive beam with a first beamwidth and retransmit the signaling using a transmit beam with a second, different beamwidth.

23 Claims, 17 Drawing Sheets

DYNAMIC QUASI CO-LOCATION MAPPING FOR MULTIPLE LINKS WITH ASSISTIVE COMMUNICATION NODES

FIELD OF TECHNOLOGY

The following relates to wireless communications, including dynamic quasi co-location (QCL) mapping for multiple links with assistive communication nodes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may utilize assistive nodes, such as an intelligent reflective surface (IRS), to relay signaling between wireless devices. Some techniques for reflecting signaling using an assistive device for beamformed communications can be improved.

SUMMARY

The described techniques relate to improved methods, systems, devices, and apparatuses that support dynamic quasi co-location (QCL) mapping for multiple links with assistive communication nodes. Generally, the described techniques provide for configuring a QCL association between receive beams and transmit beams at an assistive node, such as an intelligent reflective surface (IRS). A first wireless device, such as a base station, may transmit signaling to an assistive node, and the assistive node may retransmit the signaling via reflections to a second wireless device, such as a user equipment (UE). The assistive node may be configured with a mapping between receive beams and transmit beams at the assistive node. For example, the base station may configure a QCL association between receive beams and transmit beams at the assistive node. The mapping may enable the assistive node to receive signaling using a receive beam with a first beamwidth and retransmit the signaling using a transmit beam with a second, different beamwidth. For example, the assistive node may receive signaling from the base station using a receive beam of broad beamwidth and retransmit the signaling to a UE using a transmit beam of narrow beamwidth which is associated with the receive beam of broad beamwidth.

A method for wireless communications at an assistive node is described. The method may include receiving, at the assistive node, control signaling indicating a beam refinement procedure for associating a receive beam for communications between the assistive node and a first device via a first link with a transmit beam for communications between the assistive node and a second device via a second link, receiving a message from the first device over the first link using the receive beam having a first beamwidth, and transmitting the message to the second device over the second link using the transmit beam having a second beamwidth based on the beam refinement procedure.

An apparatus for wireless communications at an assistive node is described. The apparatus may include a processor, memory coupled with the processor, and instructions stored in the memory. The instructions may be executable by the processor to cause the apparatus to receive, at the assistive node, control signaling indicating a beam refinement procedure for associating a receive beam for communications between the assistive node and a first device via a first link with a transmit beam for communications between the assistive node and a second device via a second link, receive a message from the first device over the first link using the receive beam having a first beamwidth, and transmit the message to the second device over the second link using the transmit beam having a second beamwidth based on the beam refinement procedure.

Another apparatus for wireless communications at an assistive node is described. The apparatus may include means for receiving, at the assistive node, control signaling indicating a beam refinement procedure for associating a receive beam for communications between the assistive node and a first device via a first link with a transmit beam for communications between the assistive node and a second device via a second link, means for receiving a message from the first device over the first link using the receive beam having a first beamwidth, and means for transmitting the message to the second device over the second link using the transmit beam having a second beamwidth based on the beam refinement procedure.

A non-transitory computer-readable medium storing code for wireless communications at an assistive node is described. The code may include instructions executable by a processor to receive, at the assistive node, control signaling indicating a beam refinement procedure for associating a receive beam for communications between the assistive node and a first device via a first link with a transmit beam for communications between the assistive node and a second device via a second link, receive a message from the first device over the first link using the receive beam having a first beamwidth, and transmit the message to the second device over the second link using the transmit beam having a second beamwidth based on the beam refinement procedure.

In some examples of the method, apparatuses, and non-transitory computer-readable medium described herein, receiving the control signaling may include operations, features, means, or instructions for receiving an indication of a QCL association mapping a first set of one or more beams including at least the receive beam to a second set of one or more beams including at least the transmit beam.

Some examples of the method, apparatuses, and non-transitory computer-readable medium described herein may further include operations, features, means, or instructions for receiving the indication of the QCL association between a reference signal received using the receive beam and transmitted using the transmit beam, where a first parameter determined based on receiving the reference signal using the receive beam corresponds to a second parameter associated with transmitting the reference signal using the transmit beam.

In some examples of the method, apparatuses, and non-transitory computer-readable medium described herein, transmitting the message may include operations, features, means, or instructions for transmitting, to the second device, the message over the second link using the transmit beam with the second beamwidth which may be wider than the first beamwidth.

In some examples of the method, apparatuses, and non-transitory computer-readable medium described herein, transmitting the message may include operations, features, means, or instructions for transmitting, to the second device, the message over the second link using the transmit beam with the second beamwidth which may be narrower than the first beamwidth.

Some examples of the method, apparatuses, and non-transitory computer-readable medium described herein may further include operations, features, means, or instructions for receiving, from the second device over the second link, a request to disable the beam refinement procedure and transmitting, to the first device over the first link, the request to disable the beam refinement procedure.

Some examples of the method, apparatuses, and non-transitory computer-readable medium described herein may further include operations, features, means, or instructions for selecting the transmit beam for the beam refinement procedure based on the control signaling indicating a mapping between the transmit beam and the receive beam.

In some examples of the method, apparatuses, and non-transitory computer-readable medium described herein, the message includes a data message, a control message, or one or more reference signals, or any combination thereof.

In some examples of the method, apparatuses, and non-transitory computer-readable medium described herein, the assistive node may be an IRS, a reflectarray, or a relaying device.

In some examples of the method, apparatuses, and non-transitory computer-readable medium described herein, the first device may be a base station, a transmission/reception point (TRP), or an integrated access and backhaul (IAB) node.

In some examples of the method, apparatuses, and non-transitory computer-readable medium described herein, the second device may be a UE or a customer premises equipment (CPE).

A method for wireless communications at a first device is described. The method may include transmitting, to an assistive node, control signaling indicating a beam refinement procedure for associating a receive beam at the assistive node with a transmit beam at the assistive node, where the receive beam is used at the assistive node for communications between the first device and the assistive node via a first link, and the transmit beam is used at the assistive node for communications between the assistive node and a second device via a second link and transmitting a message to the assistive node over the first link based on a mapping between the receive beam at the assistive node and the transmit beam at the assistive node.

An apparatus for wireless communications at a first device is described. The apparatus may include a processor, memory coupled with the processor, and instructions stored in the memory. The instructions may be executable by the processor to cause the apparatus to transmit, to an assistive node, control signaling indicating a beam refinement procedure for associating a receive beam at the assistive node with a transmit beam at the assistive node, where the receive beam is used at the assistive node for communications between the first device and the assistive node via a first link, and the transmit beam is used at the assistive node for communications between the assistive node and a second device via a second link and transmit a message to the assistive node over the first link based on a mapping between the receive beam at the assistive node and the transmit beam at the assistive node.

Another apparatus for wireless communications at a first device is described. The apparatus may include means for transmitting, to an assistive node, control signaling indicating a beam refinement procedure for associating a receive beam at the assistive node with a transmit beam at the assistive node, where the receive beam is used at the assistive node for communications between the first device and the assistive node via a first link, and the transmit beam is used at the assistive node for communications between the assistive node and a second device via a second link and means for transmitting a message to the assistive node over the first link based on a mapping between the receive beam at the assistive node and the transmit beam at the assistive node.

A non-transitory computer-readable medium storing code for wireless communications at a first device is described. The code may include instructions executable by a processor to transmit, to an assistive node, control signaling indicating a beam refinement procedure for associating a receive beam at the assistive node with a transmit beam at the assistive node, where the receive beam is used at the assistive node for communications between the first device and the assistive node via a first link, and the transmit beam is used at the assistive node for communications between the assistive node and a second device via a second link and transmit a message to the assistive node over the first link based on a mapping between the receive beam at the assistive node and the transmit beam at the assistive node.

In some examples of the method, apparatuses, and non-transitory computer-readable medium described herein, transmitting the control signaling may include operations, features, means, or instructions for transmitting an indication of a QCL association mapping a first set of one or more beams including at least the receive beam to a second set of one or more beams including at least the transmit beam.

Some examples of the method, apparatuses, and non-transitory computer-readable medium described herein may further include operations, features, means, or instructions for transmitting the indication of the QCL association between a reference signal transmitted by the first device to the assistive node via the first link and transmitted by the assistive node to the second device via the second link.

In some examples of the method, apparatuses, and non-transitory computer-readable medium described herein, transmitting the control signaling may include operations, features, means, or instructions for transmitting, to the assistive node, the control signaling configuring the mapping between the transmit beam and the receive beam, where the transmit beamwidth may be wider than the receive beamwidth.

In some examples of the method, apparatuses, and non-transitory computer-readable medium described herein, transmitting the control signaling may include operations, features, means, or instructions for transmitting, to the assistive node, the control signaling configuring the mapping between the transmit beam and the receive beam, where the receive beamwidth may be wider than the transmit beamwidth.

Some examples of the method, apparatuses, and non-transitory computer-readable medium described herein may further include operations, features, means, or instructions for determining a threshold for the beam refinement procedure and transmitting an indication of the threshold to the assistive node or the second device, or both.

In some examples of the method, apparatuses, and non-transitory computer-readable medium described herein, determining the threshold may include operations, features, means, or instructions for receiving, from the assistive node or the second device, or both, a request to disable the beam refinement procedure based on a signal strength of a relayed transmission of the signaling failing to satisfy the threshold.

A method for wireless communications at a second device is described. The method may include receiving, from a first device or an assistive node, or both, control signaling indicating a beam refinement procedure for mapping a receive beam at the assistive node to a transmit beam at the assistive node, where the receive beam is used at the assistive node for communications between the first device and the assistive node via a first link, and the transmit beam is used at the assistive node for communications between the assistive node and the second device via a second link and receiving, from the assistive node, a message over the second link.

An apparatus for wireless communications at a second device is described. The apparatus may include a processor, memory coupled with the processor, and instructions stored in the memory. The instructions may be executable by the processor to cause the apparatus to receive, from a first device or an assistive node, or both, control signaling indicating a beam refinement procedure for mapping a receive beam at the assistive node to a transmit beam at the assistive node, where the receive beam is used at the assistive node for communications between the first device and the assistive node via a first link, and the transmit beam is used at the assistive node for communications between the assistive node and the second device via a second link and receive, from the assistive node, a message over the second link.

Another apparatus for wireless communications at a second device is described. The apparatus may include means for receiving, from a first device or an assistive node, or both, control signaling indicating a beam refinement procedure for mapping a receive beam at the assistive node to a transmit beam at the assistive node, where the receive beam is used at the assistive node for communications between the first device and the assistive node via a first link, and the transmit beam is used at the assistive node for communications between the assistive node and the second device via a second link and means for receiving, from the assistive node, a message over the second link.

A non-transitory computer-readable medium storing code for wireless communications at a second device is described. The code may include instructions executable by a processor to receive, from a first device or an assistive node, or both, control signaling indicating a beam refinement procedure for mapping a receive beam at the assistive node to a transmit beam at the assistive node, where the receive beam is used at the assistive node for communications between the first device and the assistive node via a first link, and the transmit beam is used at the assistive node for communications between the assistive node and the second device via a second link and receive, from the assistive node, a message over the second link.

Some examples of the method, apparatuses, and non-transitory computer-readable medium described herein may further include operations, features, means, or instructions for receiving, from the first device or the assistive node, or both, an indication of a signal strength threshold for the beam refinement procedure.

Some examples of the method, apparatuses, and non-transitory computer-readable medium described herein may further include operations, features, means, or instructions for determining a signal strength of the message does not satisfy the signal strength threshold and transmitting, to the assistive node or the first device, or both, an indication to disable the beam refinement procedure based on the signal strength failing to satisfy the signal strength threshold.

DETAILED DESCRIPTION

Figure 1:
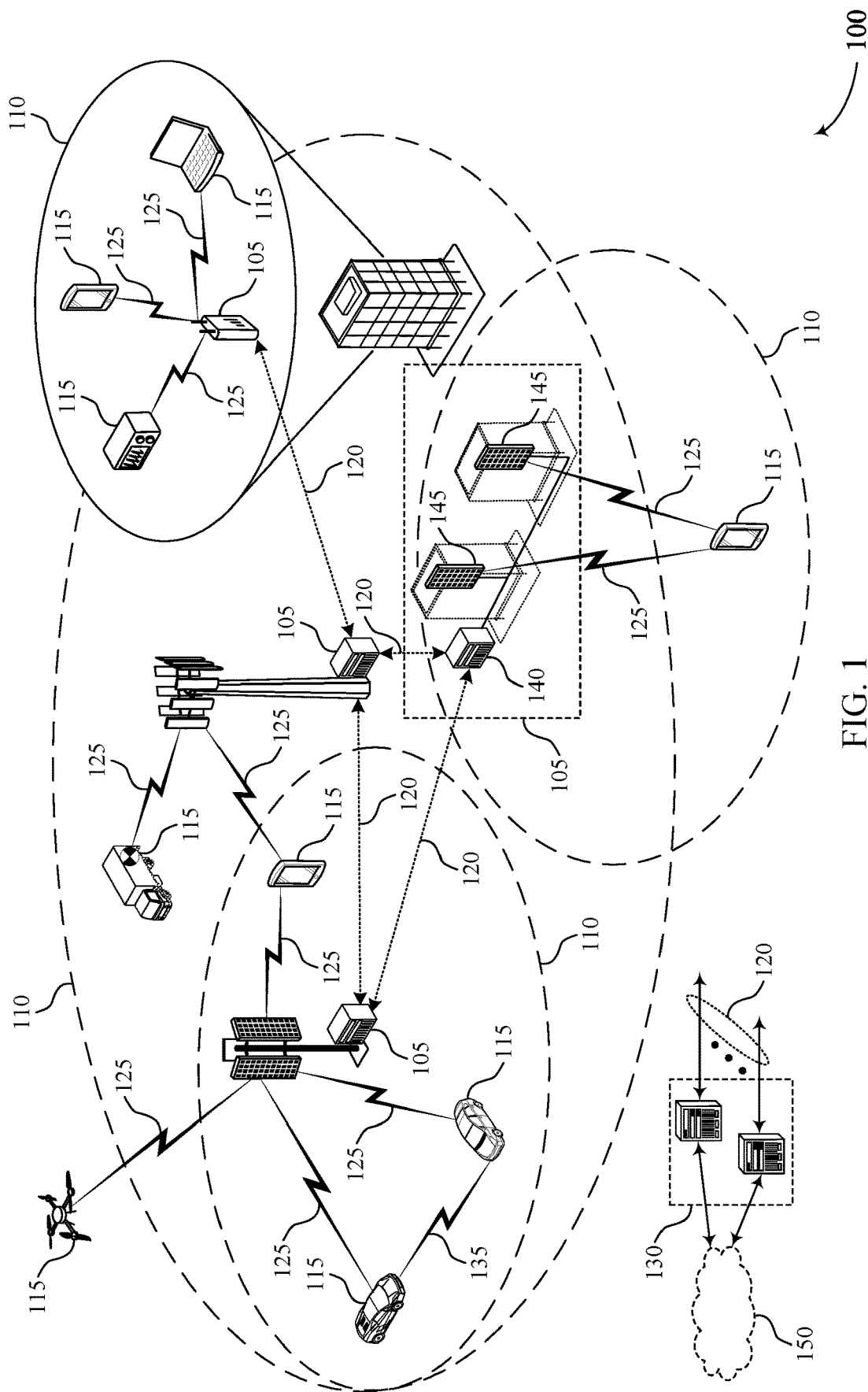
FIG. 1 illustrates an example of a wireless communications system that supports dynamic quasi co-location (QCL) mapping for multiple links with assistive communication nodes in accordance with aspects of the present disclosure.

Some wireless communications systems may use assistive nodes, such as intelligent reflective surfaces (IRSs), repeaters, or relays, to reflect signaling between wireless devices. For example, an assistive node may create viable paths for signaling from a base station to a user equipment (UE) while avoiding obstructions or blockages that affect direct connectivity between the base station and UE. The base station and the UE may support beamformed communications using different sized beamwidths. A beamwidth may refer to a size, or width, of a beam used to communicate beamformed signaling. The base station and the UE may support communications using different beamwidths, such as wide, or broad, beamwidth beams and narrow beamwidth beams. Wide beamwidth beams may be more efficient for some communication scenarios, such as when a communicating device is in a high mobility scenario, or for usage in a control channel with a low intended data rate and low latencies in acquiring the beam. Narrow beamwidth beams may be more efficient for communications in other situations, such as when the device is stationary, or if a higher or peak data rate is appropriate. If an assistive node is stationary, a first, narrow beamwidth beam may be more efficient for communications between the gNB and the assistive node, while a second, broader beamwidth beam may be efficient for communications between the assistive node and the UE. However, current techniques do not provide support for changing a beamwidth at an assistive node across receive operations with one device and transmit operations with another device.

Wireless communications systems described herein implement techniques for a beam refinement procedure to adjust a beamwidth at an assistive node. For example, a base station may configure a quasi co-location (QCL) association across link at the assistive node. The assistive node may be configured with a QCL configuration which maps a first set of receive beam for a first communication link (e.g., between the assistive node and the base station) to a second set of transmit beams for a second communication link (e.g., between the assistive node and a UE). The assistive node may reflect reference signals, control signaling, and data signaling, and the reference signals may be used to define QCL types for the assistive node to vary the beamwidth across the two communication links. The assistive node may be configured with a mapping from narrow receive beams to wide or broad transmit beams or a mapping from wide or broad receive beams to narrow transmit beams, or both. The base station, the UE, or the assistive node, or any combination thereof, may configure or be configured with a threshold and may disable the beam refinement procedure if a signal strength drops below the threshold. These techniques may enable using efficient beamwidths for both communication links at an assistive node.

Aspects of the disclosure are initially described in the context of wireless communications systems. Aspects of the disclosure are further illustrated by and described with reference to apparatus diagrams, system diagrams, and flowcharts that relate to dynamic QCL mapping for multiple links with assistive communication nodes.

FIG. 1 illustrates an example of a wireless communications system 100 that supports dynamic QCL mapping for multiple links with assistive communication nodes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100, and wireless communications systems described herein, may implement techniques to configure a QCL association between receive beams and transmit beams at an assistive node, such as an IRS. A first wireless device, such as a base station 105, may transmit signaling to an assistive node, and the assistive node may retransmit the signaling to a second wireless device, such as a UE 115. The assistive node may be configured with a mapping between receive beams and transmit beams at the assistive node. For example, the base station 105 may configure a QCL association between receive beams and transmit beams at the assistive node. The mapping may enable the assistive node to receive signaling using a receive beam with a first beamwidth and retransmit the signaling using a transmit beam with a second, different beamwidth. For example, the assistive node may receive signaling from a base station 105 using a broad receive beam and retransmit the signaling to a UE 115 using a narrow transmit beam which is associated with the broad receive beam.

Figure 2:
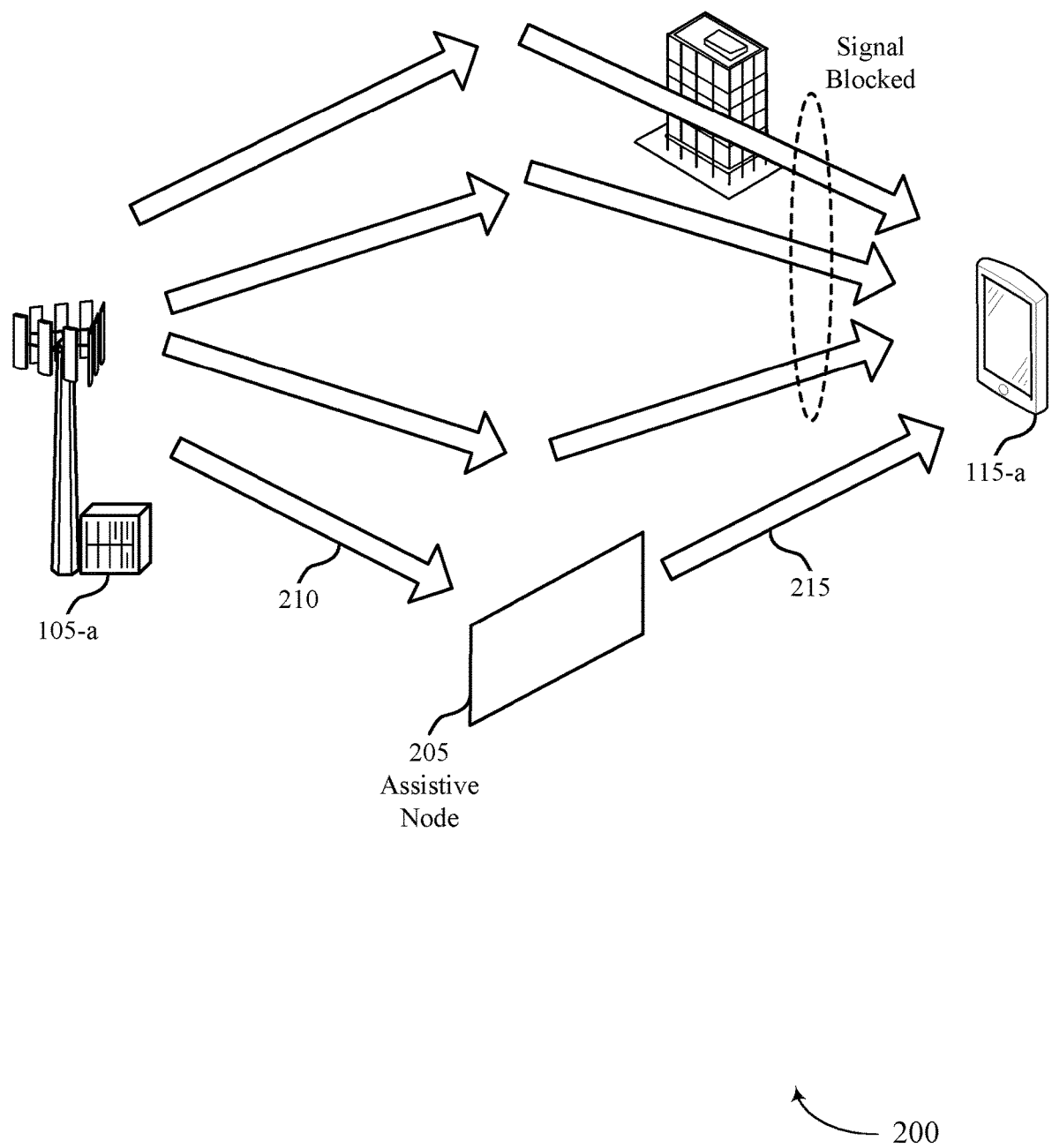
FIGS. 2 through 4 illustrate examples of wireless communications systems that support dynamic QCL mapping for multiple links with assistive communication nodes in accordance with aspects of the present disclosure.

FIG. 2 illustrates an example of a wireless communications system 200 that supports dynamic QCL mapping for multiple links with assistive communication nodes in accordance with aspects of the present disclosure. The wireless communications system may include base station 105-a and UE 115-a, which may be respective examples of a base station 105 and a UE 115 as described with reference to FIG. 1. In some cases, base station 105-a may be an example of a transmission/reception point (TRP) or an integrated access and backhaul (IAB) node. In some cases, UE 115-a may be an example of a customer premises equipment (CPE) or an IAB node.

The wireless communications system 200 may support use of assistive nodes, such as an assistive node 205. The assistive node 205 may be an example of an IRS, a passive reflectarray, a repeater, a relay node, or any combination thereof. An IRS may be a device which reflects or propagates signaling from a first device toward a second device, such as by using passive reflecting elements or active elements, or both. In some cases, the IRS may be configurable via control signaling. In some examples, a reflectarray may be a similar device which can reflect signaling between devices. In some examples, an assistive node 205, such as an IRS or a reflectarray, may be configured to change a direction of the reflected signaling.

The assistive node 205 may provide viable paths for signaling from base station 105-a to UE 115-a, such as if there are obstructions between base station 105-a and UE 115-a. For example, one direction of signaling toward UE 115-a may be blocked by a building, while other directions of signaling toward UE 115-a may be blocked by the hand of a user operating UE 115-a, among other obstructions or blockages. The assistive node 205 may relay, or reflect, signaling received from base station 105-a to UE 115-a, which may not be blocked by obstructions. For example, base station 105-a may transmit signaling to the assistive node 205 on a first link 210, and the assistive node 205 may transmit the signaling to UE 115-a on a second link 215.

Base station 105-a may transmit signaling to the assistive node 205 using a first transmit power (e.g., $\rho_1$), and the assistive node 205 may transmit the signaling to UE 115-a using a second transmit power (e.g., $\rho_2$). A model for the system may be represented by Equation (1) below, where $H_{UE,gNB}$ denotes the $N_r \times N_t$ channel matrix between base station 105-a and UE 115-a, $H_{Assistive,gNB}$ denotes the $N_{r,1} \times N_t$ channel matrix between base station 105-a and the assistive node 205, $H_{UE,Assistive}$ denotes the $N_r \times N_{t,1}$ channel matrix between the assistive node 205 and UE 115-a, $f_1$ denotes the $N_t \times 1$ beamforming vector at base station 105-a, $g_1$ denotes the $N_r \times 1$ beamforming vector at UE 115-a, R denotes an $N_{t,1} \times N_{r,1}$ reflection matrix at the assistive node 205, and s is a complex scalar symbol transmitted by base station 105-a.

$$\hat{s} = g_2^H (\sqrt{\rho_1 \rho_2} \cdot H_{UE,Assistive} R H_{Assistive,gNB} f_1 s + n) \qquad (1)$$

The wireless communications system 200 may support beamformed communications. For example, base station 105-a may transmit beamformed signaling on the first link 210, and the assistive node 205 may relay the beamformed signaling on the second link 215. A broad beam codebook may generally be of smaller size (e.g., fewer beams to select from), which may reduce latency in beam selection, as a transmitting device selects from or scans fewer beams. However, a broad beam codebook may reduce beamforming array gain and lead to lower achieved signal-to-noise ratio (SNR).

Different beamwidths may provide different advantages for different scenarios. For example, a broad beam codebook may be efficient for initial link acquisition or control channel signaling, and a narrow beam codebook may be efficient for shared channel signaling, mission-mode or peak performance operations, etc. While a system may use broad beams for all signaling to reduce latency, using broad beams may reduce realized SNR at a UE 115, such as UE 115-a.

The wireless communications system 200 may implement techniques to utilize different beamwidths for a receive beam and a transmit beam at the assistive node 205. For example, the assistive node 205 may be configured with a QCL mapping between receive beams and transmit beams at the assistive node 205. These techniques may provide for a QCL mapping across the first link 210 and the second link 215, mapping one or more receive beams at the assistive node 205 to one or more transmit beams at the assistive node 205, where the transmit beam and the receive beams may have some different properties (e.g., beamwidth, beam direction, Doppler or delay information, etc.). Therefore, the assistive node 205 may use different beamwidths when communicating with base station 105-a and UE 115-a.

Base station 105-a may transmit control signaling indicating a QCL configuration for the assistive node 205. The assistive node 205 can reflect reference signals (e.g., in addition to control and data signaling), and the reflected reference signals may be used to define QCL types or configurations at the assistive node 205. For example, the reflected reference signals may not have a change in properties such as Doppler or delay spread. Therefore, base station 105-a may define Doppler and delay spread for the second hop (e.g., corresponding to the second link 215) based on the first hop (e.g., corresponding to the first link 210). A QCL association or mapping may be configured between received beams used at the assistive node 205 and transmit beams used at the assistive node 205. For example, the assistive node 205 may select a transmit beam based on a receive beam used to receive signaling from base station 105-a. In some cases, the QCL associations may be a QCL Type-A association, a QCL Type-D association, or another QCL type.

For example, the assistive node 205 and base station 105-a may each be stationary, so the first link 210 may be referred to as stationary. Base station 105-a and the assistive node 205 may not frequently perform beam updates for the first link 210, so the assistive node may use a narrow beam codebook for the first link 210. UE 115-a may be highly mobile, which may lead to frequent beam updates if using a narrow beam codebook for the second link 215. Therefore, the assistive node 205 may be configured to use a broad beam codebook for the second link 220. Some additional examples of this may be described in more detail herein, such as with reference to FIG. 3.

In some other examples, the assistive node 205 may reflect beams for a beam reselection procedure to UE 115-a. For example, base station 105-a may perform a beam refinement procedure (e.g., a P2 procedure) on the first hop over the first link 210. As base station 105-a attempts multiple P2 beams, the assistive node 205 may reflect the beams to UE 115-a. Base station 105-a may use one beam to communicate with the assistive node 205, and the assistive node 205 may vary the beamwidth for the second hop (e.g., on the second link 215). For example, a set of transmit beams may be configured for the assistive node 205 to use to transmit to UE 115-a. When the assistive node 205 receives P2 refinement control signaling, the assistive node 205 may enable beam sweeping across the set of beams. Some additional examples of this may be described in more detail herein, such as with reference to FIG. 4.

In some cases, base station 105-a or UE 115-a or the assistive node 205, or any combination thereof, may disable the beam refinement procedure. For example, UE 115-a may measure a signal strength on the second link 215 and request, or indicate, for base station 105-a to disable the beam refinement procedure. The measurement may be based on a difference of signal strength across different beams used for a beam refinement procedure (e.g., a P2 beam refinement procedure) performed by base station 105-a. In some cases, base station 105-a may configure UE 115-a or the assistive node 205, or both, with a threshold. UE 115-a may request to disable the beam refinement procedure if the measured signal strength (e.g., for one beam or for all beams) drops below the threshold. In some cases, UE 115-a may request for the beam refinement procedure to be stopped for a certain duration.

For example, base station 105-a may perform a beam refinement procedure with a set of beams including $B_1$ through $B_N$. Base station 105-a may transmit using these beams to the assistive node 205, and the assistive node may reflect the signaling toward UE 115-a. UE 115-a may measure the signal strength for each of these beams to obtain corresponding signal strengths $S_1$ through $S_N$. Base station 105-a may configure UE 115-a with a threshold, $\Delta$. UE 115-a may request to disable the beam refinement procedure if a difference between two measured signal strengths, $\max_{i,j}|S_i-S_j|$ is less than the configured threshold. In some cases, UE 115-a may request to disable a beam refinement procedure based on the configured threshold for a beam refinement procedure without the assistive node 205. For example, base station 105-a may perform a beam refinement procedure by transmitting using a set of beams directly to UE 115-a, and UE 115-a may determine whether to disable the beam refinement procedure based on the configured threshold.

In some cases, a beam refinement procedure may refer to changing a beamwidth at an assistive node 205. For example, the assistive node 205 receiving signaling from base station 105-a using a receive beam with a first beamwidth and transmitting, or relaying, the signaling to UE 115-a using a transmit beam with a second, different beamwidth may be referred to as a beam refinement procedure. Additionally, or alternatively, a beam refinement procedure may refer to a P2 beam refinement procedure, where the assistive node 205 transmits to UE 115-a using multiple different beams based on base station 105-a transmitting to the assistive node 205 using multiple different beams.

Figure 3:
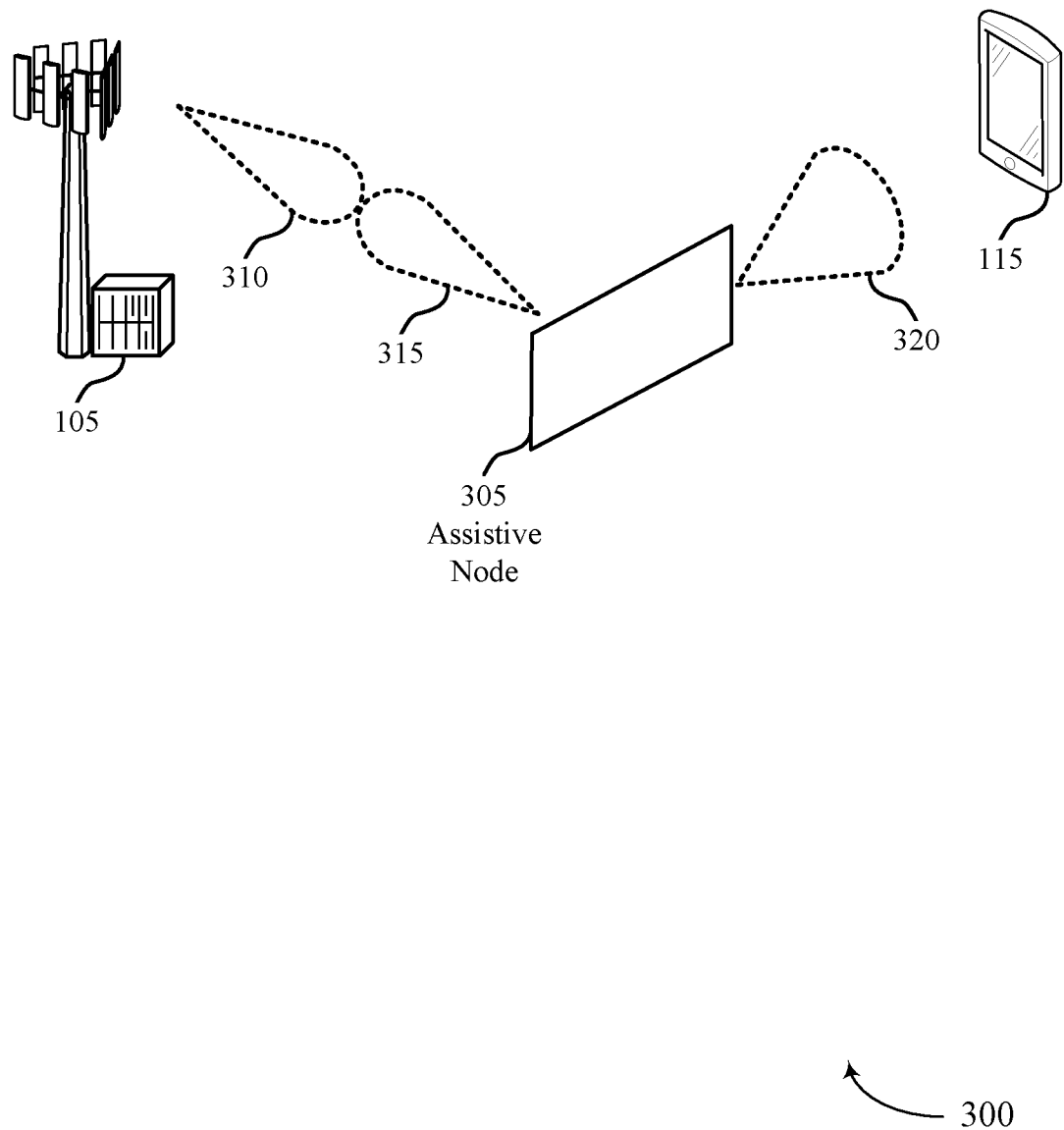

FIG. 3 illustrates an example of a wireless communications system 300 that supports dynamic QCL mapping for multiple links with assistive communication nodes in accordance with aspects of the present disclosure. The wireless communications system 300 may include aspects of, or be an example of, a wireless communications system 100 or 200 as described with reference to FIGS. 1 and 2. The wireless communications system 300 may support an assistive node 305, which may be an example of an assistive node described with reference to FIG. 2.

A base station 105 may transmit signaling to the assistive node 305, and the signaling may be reflected from the assistive node 305 to a UE 115. The assistive node 305 may provide viable paths or the signaling if direct paths are blocked or have poor channel quality. The assistive node 305 may provide techniques for a beam refinement procedure to change beamwidths across a first hop (e.g., from the base station 105 to the assistive node 305) and a second hop (e.g., from the assistive node 305 to the UE 115).

The wireless communications system 300 illustrates an example of using a narrow beamwidth receive beam and a broad beamwidth transmit beam at the assistive node 305. For example, the base station 105 may transmit to the assistive node 305 using a narrow transmit beam 310, and the assistive node 305 may use a narrow receive beam 315 to receive the signaling. The assistive node 305 may retransmit (e.g., reflect, relay, etc.) the signaling to the UE 115 using a broad transmit beam 320.

The assistive node 305 may be configured with a mapping between one or more receive beams and one or more transmit beams. For example, the base station 105 may configure a mapping between the narrow receive beam 315 and the broad transmit beam 320 across the first link and the second link. In some cases, the mapping may be an example of a QCL association or a QCL mapping across links at the assistive node 305. These techniques may enable the assistive node 305 to receive signaling from the base station 105 using a narrow beam with high SNR. The assistive node 305 may then transmit to the UE 115 using a broad beam, which may reduce beamforming latency and assist the base station 105 to track the UE 115 if the UE 115 moves positions.

Figure 4:
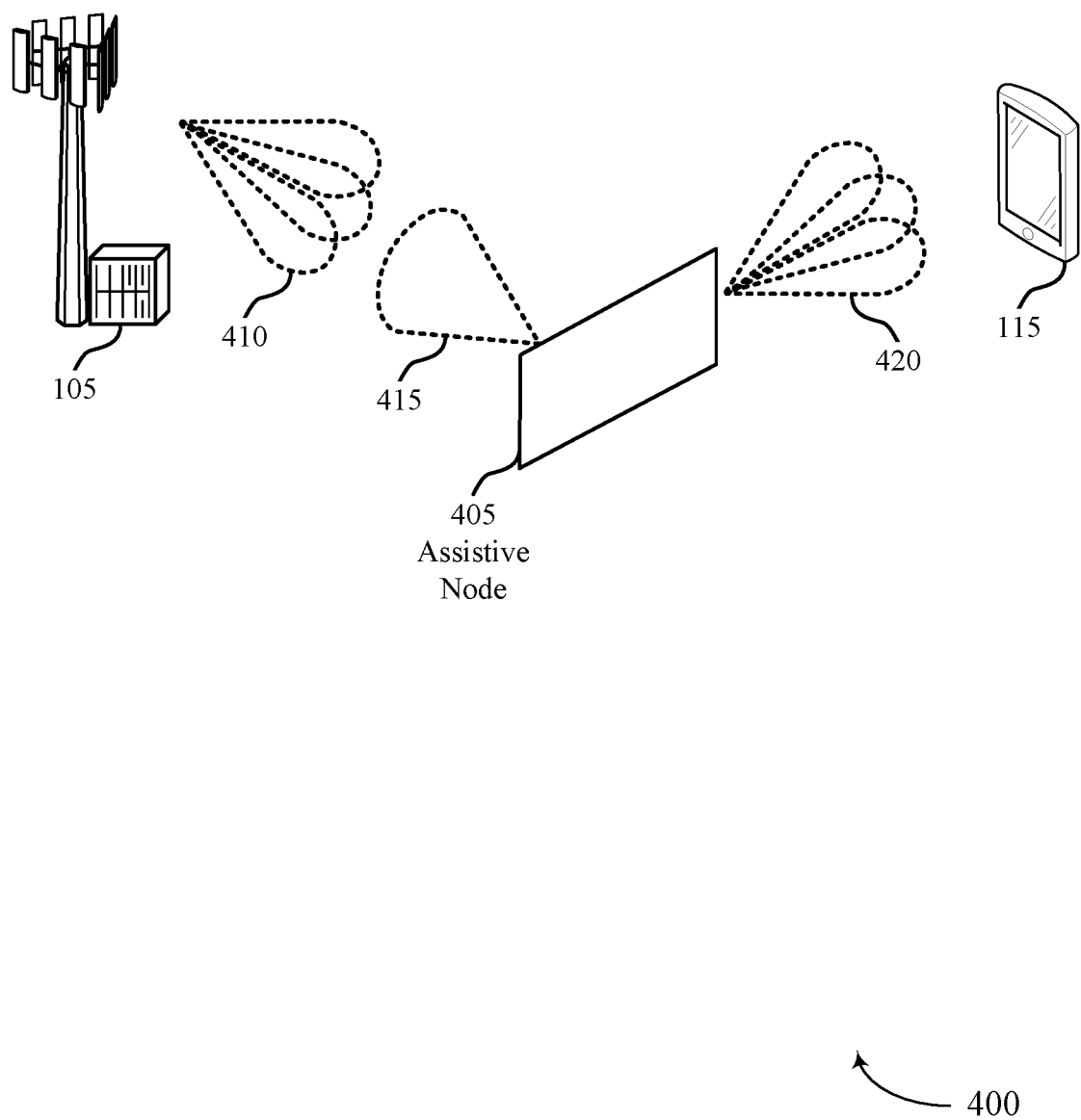

FIG. 4 illustrates an example of a wireless communications system 400 that supports dynamic QCL mapping for multiple links with assistive communication nodes in accordance with aspects of the present disclosure. The wireless communications system 400 may include aspects of, or be an example of, a wireless communications system 100 or 200 as described with reference to FIGS. 1 and 2. The wireless communications system 400 may support an assistive node 405, which may be an example of a an assistive node described with reference to FIG. 2.

A base station 105 may transmit signaling to the assistive node 405, and the signaling may be reflected from the assistive node 405 to a UE 115. The assistive node 405 may provide viable paths if the signaling over direct paths are blocked or have poor channel quality. The assistive node 405 may provide techniques for a beam refinement procedure to change beamwidths across a first hop (e.g., from the base station 105 to the assistive node 405) and a second hop (e.g., from the assistive node 405 to the UE 115).

The wireless communications system 400 illustrates an example of using a broad receive beam and one or more narrow transmit beams at the assistive node 405. For example, the base station 105 may perform a beam refinement procedure, such as a P2 refinement procedure, and transmit using a set of narrow beams 410 to the assistive node 405. As the base station 105 attempts multiple narrow beams, the assistive node 405 may reflect these beams to the UE 115. The assistive node 405 may receive the signaling on the different beams using a broad receive beam 415, and the assistive node 405 may retransmit (e.g., reflect, relay, etc.) the signaling to the UE 115 using a set of narrow transmit beams 420. The base station 105 may use one beam to communicate with the assistive node 405, and the assistive node 405 may vary the beamwidth for the second hop (e.g., to transmit to the UE 115).

The assistive node 405 may be configured with a mapping between beams on the first link with the base station 105 and beams on the second link with the UE 115. For example, the base station 105 may configure a mapping between the broad receive beam 415 and the set of narrow transmit beams 420. In some cases, the base station 105 may configure a mapping between the set of narrow beams 410 (e.g., from the base station 105) and the set of narrow transmit beams 420 (e.g., from the assistive node 405). When the assistive node 405 receives beam refinement control signaling, the assistive node may enable beam sweeping across the set of narrow transmit beams 420. In some cases, the set of narrow transmit beams 420 at the assistive node 405 may be preconfigured, fixed, or configured via control signaling.

In some cases, the set of narrow beams 410 from the base station 105 may include one or more beams. For example, the base station 105 may transmit to the assistive node 405 using a fixed beam direction, where the set of narrow beams 410 includes one beam or one beam direction. When the base station 105 triggers a beam refinement procedure, the assistive node 405 may transmit to the UE 115 using the set of narrow transmit beams 420. In some additional, or alternative, examples the assistive node 405 may use a narrow receive beam for a beam refinement procedure, such as a P2 beam refinement procedure.

Figure 5:
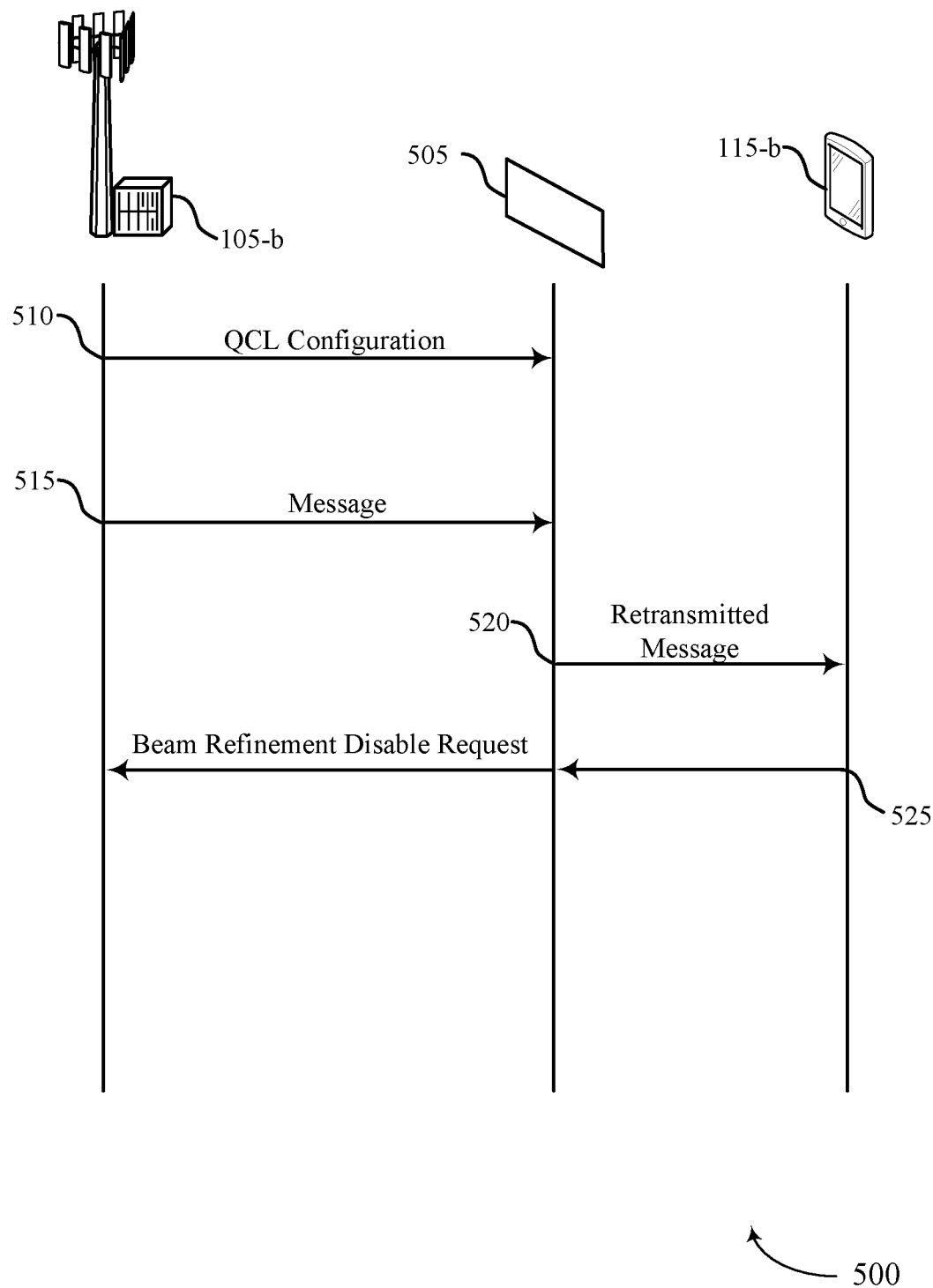
FIG. 5 illustrates an example of a process flow that supports dynamic QCL mapping for multiple links with assistive communication nodes in accordance with aspects of the present disclosure.

FIG. 5 illustrates an example of a process flow 500 that supports dynamic QCL mapping for multiple links with assistive communication nodes in accordance with aspects of the present disclosure. The process flow 500 may be implemented by base station 105-*b*, UE 115-*b*, or an assistive node 505, or any combination thereof. Base station 105-*b* may be an example of a base station 105 as described herein, and UE 115-*b* may be an example of a UE 115 as described herein. In some cases, some processes or signaling of the process flow 500 may occur in different orders. Additionally, or alternatively, some processes or signaling may not occur for some implementations, or some additional processes or signaling not shown may be performed, or both.

Base station 105-*b* may transmit signaling to the assistive node 505, and the signaling may be reflected from the assistive node 505 to UE 115-*b*. The assistive node 505 may provide viable paths or the signaling if direct paths are blocked or have poor channel quality. The process flow 500 shows some techniques for a beam refinement procedure to change beamwidths across a first hop (e.g., from base station 105-*b* to the assistive node 505) and a second hop (e.g., from the assistive node 505 to UE 115-*b*).

At 510, the assistive node 505 may receive control signaling indicating a beam refinement procedure for associating a receive beam for communications between the assistive node and a first device (e.g., base station 105-*b*) via a first link with a transmit beam for communications between the assistive node and a second device (e.g., UE 115-*b*) via a second link. For example, the assistive node 505 may receive an indication of a QCL association mapping a first set of one or more beams including at least the receive beam to a second set of one or more beams including at least the transmit beam. The QCL association may, for example, map receive beams of a first beamwidth to transmit beams of a second, different beamwidth. This mapping may enable the assistive node 505 to change use different beamwidths to receive signaling and retransmit the signaling. In some cases, base station 105-*b* may transmit the control signaling indicating the beam refinement procedure to the assistive node 505.

At 515, the assistive node 505 may receive a message from base station 105-*b* over the first link using the receive beam having a first beamwidth. At 520, the assistive node 505 may transmit the message to UE 115-*b* over the second link using the transmit beam having a second beamwidth based on the beam refinement procedure. For example, the assistive node 505 may receive the message using a broad receive beam and transmit the message using a narrow transmit beam. In some other examples, the assistive node 505 may receive the message using a narrow receive beam and transmit the message using a broad transmit beam. In some cases, the transmit beam may be associated with the receive beam, or mapped to the receive beam, based on the beam refinement procedure or a QCL association indicated by the control signaling.

In some examples, UE 115-*b* may determine that signal strength has decreased, and UE 115-*b* may request to disable the beam refinement procedure. For example, one or more of the transmit beams used by the assistive node 505 for the beam refinement procedure may have a weaker signal strength than a previously used beam. UE 115-*b* may determine that a signal strength of signaling (e.g., a signal strength of the message) does not satisfy a signal strength threshold, and UE 115-*b* may transmit an indication to disable the beam refinement procedure based on the signal strength failing to satisfy the signal strength threshold. In some cases, base station 105-*b* may transmit control signaling to configure the signal strength threshold at UE 115-*b* or the assistive node 505, or both. Base station 105-*b* may receive the indication to disable the beam refinement procedure, and refrain from performing the beam refinement procedure. In some cases, base station 105-*b* may transmit control signaling to the assistive node 505 to disable the beam refinement procedure at the assistive node 505. Additionally, or alternatively, the assistive node 505 may disable the beam refinement procedure based on signaling from UE 115-*b*.

Figure 6:
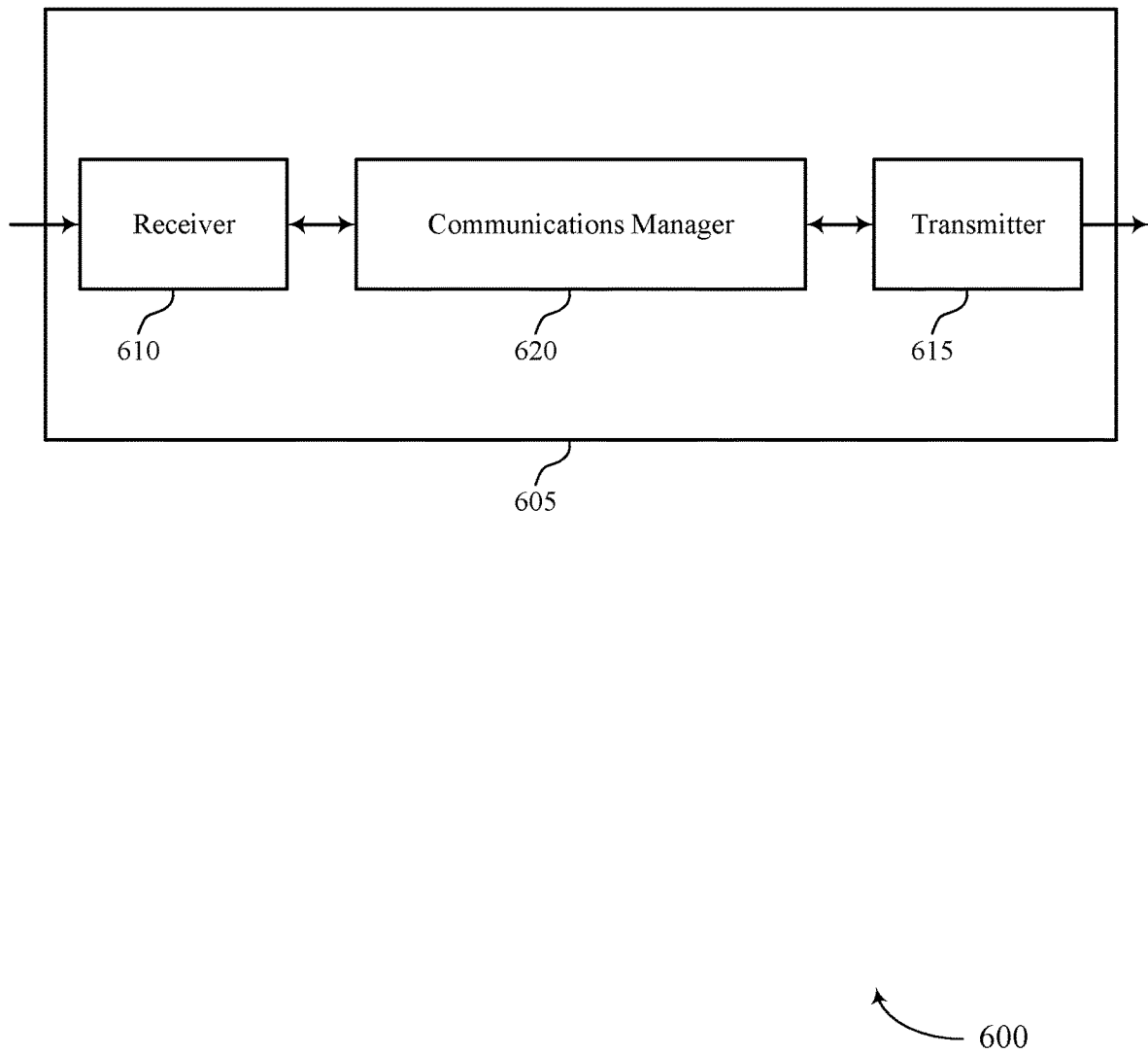
FIGS. 6 and 7 show block diagrams of devices that support dynamic QCL mapping for multiple links with assistive communication nodes in accordance with aspects of the present disclosure.

FIG. 6 shows a block diagram 600 of a device 605 that supports dynamic QCL mapping for multiple links with assistive communication nodes in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic QCL mapping for multiple links with assistive communication nodes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic QCL mapping for multiple links with assistive communication nodes). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of dynamic QCL mapping for multiple links with assistive communication nodes as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at an assistive node in accordance with examples as disclosed herein. For example, the communications manager 620 may be configured as or otherwise support a means for receiving, at the assistive node, control signaling indicating a beam refinement procedure for associating a receive beam for communications between the assistive node and a first device via a first link with a transmit beam for communications between the assistive node and a second device via a second link. The communications manager 620 may be configured as or otherwise support a means for receiving a message from the first device over the first link using the receive beam having a first beamwidth. The communications manager 620 may be configured as or otherwise support a means for transmitting the message to the second device over the second link using the transmit beam having a second beamwidth based on the beam refinement procedure.

Additionally or alternatively, the communications manager 620 may support wireless communications at a second device in accordance with examples as disclosed herein. For example, the communications manager 620 may be configured as or otherwise support a means for receiving, from a first device or an assistive node, or both, control signaling indicating a beam refinement procedure for mapping a receive beam at the assistive node to a transmit beam at the assistive node, where the receive beam is used at the assistive node for communications between the first device and the assistive node via a first link, and the transmit beam is used at the assistive node for communications between the assistive node and the second device via a second link. The communications manager 620 may be configured as or otherwise support a means for receiving, from the assistive node, a message over the second link.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced power consumption by utilizing efficient beamwidths for communications between a UE 115 and an assistive node.

Figure 7:
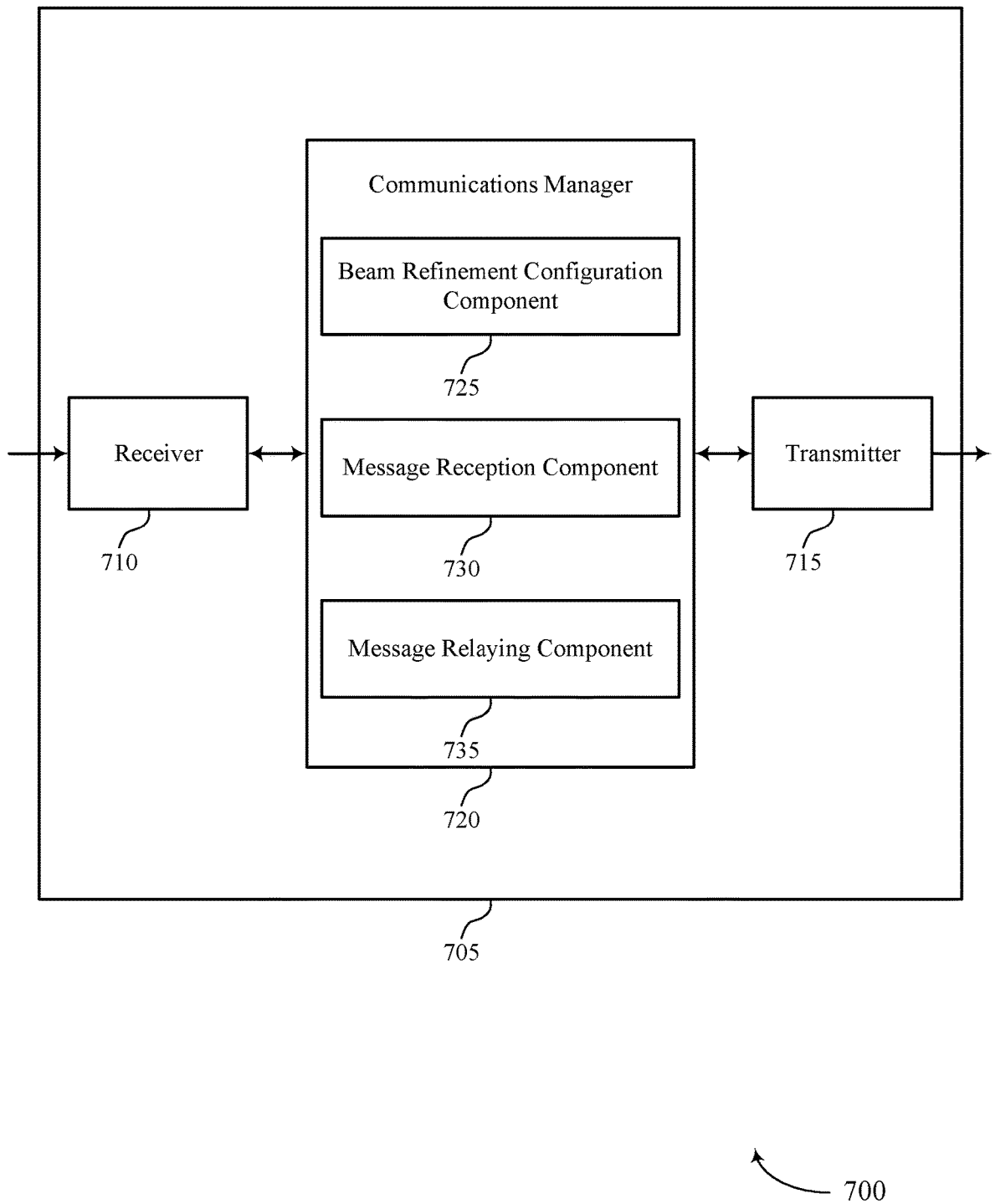

FIG. 7 shows a block diagram 700 of a device 705 that supports dynamic QCL mapping for multiple links with assistive communication nodes in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to dynamic QCL mapping for multiple links with assistive communication nodes). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to dynamic QCL mapping for multiple links with assistive communication nodes). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of dynamic QCL mapping for multiple links with assistive communication nodes as described herein. For example, the communications manager 720 may include a beam refinement configuration component 725, a message reception component 730, a message relaying component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at an assistive node in accordance with examples as disclosed herein. The beam refinement configuration component 725 may be configured as or otherwise support a means for receiving, at the assistive node, control signaling indicating a beam refinement procedure for associating a receive beam for communications between the assistive node and a first device via a first link with a transmit beam for communications between the assistive node and a second device via a second link. The message reception component 730 may be configured as or otherwise support a means for receiving a message from the first device over the first link using the receive beam having a first beamwidth. The message relaying component 735 may be configured as or otherwise support a means for transmitting the message to the second device over the second link using the transmit beam having a second beamwidth based on the beam refinement procedure.

Additionally or alternatively, the communications manager 720 may support wireless communications at a second device in accordance with examples as disclosed herein. The beam refinement configuration component 725 may be configured as or otherwise support a means for receiving, from a first device or an assistive node, or both, control signaling indicating a beam refinement procedure for mapping a receive beam at the assistive node to a transmit beam at the assistive node, where the receive beam is used at the assistive node for communications between the first device and the assistive node via a first link, and the transmit beam is used at the assistive node for communications between the assistive node and the second device via a second link. The message reception component 730 may be configured as or otherwise support a means for receiving, from the assistive node, a message over the second link.

Figure 8:
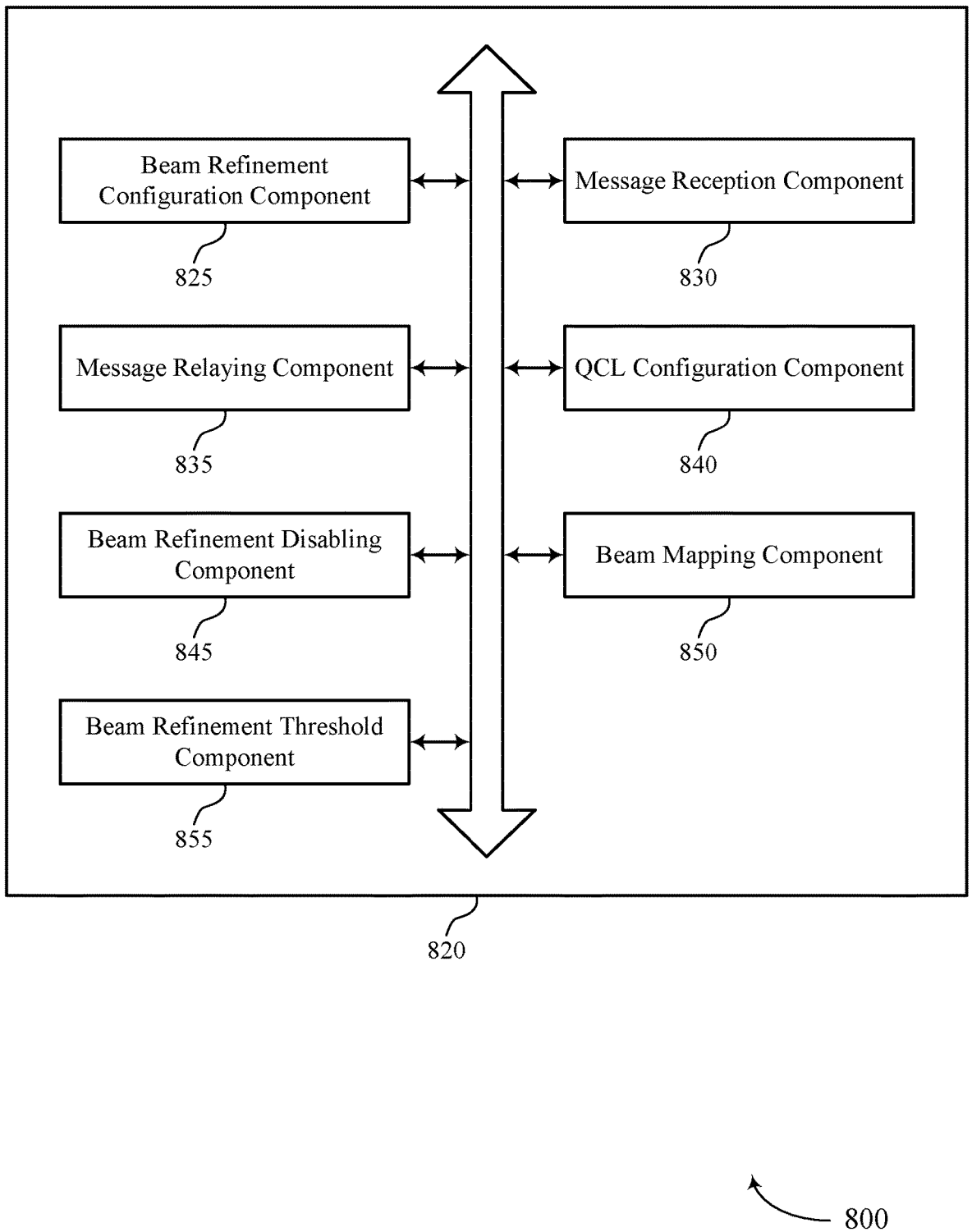
FIG. 8 shows a block diagram of a communications manager that supports dynamic QCL mapping for multiple links with assistive communication nodes in accordance with aspects of the present disclosure.

FIG. 8 shows a block diagram 800 of a communications manager 820 that supports dynamic QCL mapping for multiple links with assistive communication nodes in accordance with aspects of the present disclosure. The communications manager 820 may be an example of aspects of a communications manager 620, a communications manager 720, or both, as described herein. The communications manager 820, or various components thereof, may be an example of means for performing various aspects of dynamic QCL mapping for multiple links with assistive communication nodes as described herein. For example, the communications manager 820 may include a beam refinement configuration component 825, a message reception component 830, a message relaying component 835, a QCL configuration component 840, a beam refinement disabling component 845, a beam mapping component 850, a beam refinement threshold component 855, or any combination thereof. Each of these components may communicate, directly or indirectly, with one another (e.g., via one or more buses).

The communications manager 820 may support wireless communications at an assistive node in accordance with examples as disclosed herein. The beam refinement configuration component 825 may be configured as or otherwise support a means for receiving, at the assistive node, control signaling indicating a beam refinement procedure for associating a receive beam for communications between the assistive node and a first device via a first link with a transmit beam for communications between the assistive node and a second device via a second link. The message reception component 830 may be configured as or otherwise support a means for receiving a message from the first device over the first link using the receive beam having a first beamwidth. The message relaying component 835 may be configured as or otherwise support a means for transmitting the message to the second device over the second link using the transmit beam having a second beamwidth based on the beam refinement procedure.

In some examples, to support receiving the control signaling, the QCL configuration component 840 may be configured as or otherwise support a means for receiving an indication of a QCL association mapping a first set of one or more beams including at least the receive beam to a second set of one or more beams including at least the transmit beam.

In some examples, the QCL configuration component 840 may be configured as or otherwise support a means for receiving the indication of the QCL association between a reference signal received using the receive beam and transmitted using the transmit beam, where a first parameter determined based on receiving the reference signal using the receive beam corresponds to a second parameter associated with transmitting the reference signal using the transmit beam.

In some examples, to support transmitting the message, the message relaying component 835 may be configured as or otherwise support a means for transmitting, to the second device, the message over the second link using the transmit beam with the second beamwidth which is wider than the first beamwidth.

In some examples, to support transmitting the message, the message relaying component 835 may be configured as or otherwise support a means for transmitting, to the second device, the message over the second link using the transmit beam with the second beamwidth which is narrower than the first beamwidth.

In some examples, the beam refinement disabling component 845 may be configured as or otherwise support a means for receiving, from the second device over the second link, a request to disable the beam refinement procedure. In some examples, the beam refinement disabling component 845 may be configured as or otherwise support a means for transmitting, to the first device over the first link, the request to disable the beam refinement procedure.

In some examples, the beam mapping component 850 may be configured as or otherwise support a means for selecting the transmit beam for the beam refinement procedure based on the control signaling indicating a mapping between the transmit beam and the receive beam.

In some examples, the message includes a data message, a control message, or one or more reference signals, or any combination thereof. In some examples, the assistive node is an IRS, a reflectarray, or a relaying device. In some examples, the first device is a base station, a TRP, or an IAB node. In some examples, the second device is a UE or a CPE.

Additionally or alternatively, the communications manager 820 may support wireless communications at a second device in accordance with examples as disclosed herein. In some examples, the beam refinement configuration component 825 may be configured as or otherwise support a means for receiving, from a first device or an assistive node, or both, control signaling indicating a beam refinement procedure for mapping a receive beam at the assistive node to a transmit beam at the assistive node, where the receive beam is used at the assistive node for communications between the first device and the assistive node via a first link, and the transmit beam is used at the assistive node for communications between the assistive node and the second device via a second link. In some examples, the message reception component 830 may be configured as or otherwise support a means for receiving, from the assistive node, a message over the second link.

In some examples, the beam refinement threshold component 855 may be configured as or otherwise support a means for receiving, from the first device or the assistive node, or both, an indication of a signal strength threshold for the beam refinement procedure.

In some examples, the beam refinement threshold component 855 may be configured as or otherwise support a means for determining a signal strength of the message does not satisfy the signal strength threshold. In some examples, the beam refinement threshold component 855 may be configured as or otherwise support a means for transmitting, to the assistive node or the first device, or both, an indication to disable the beam refinement procedure based on the signal strength failing to satisfy the signal strength threshold.

Figure 9:
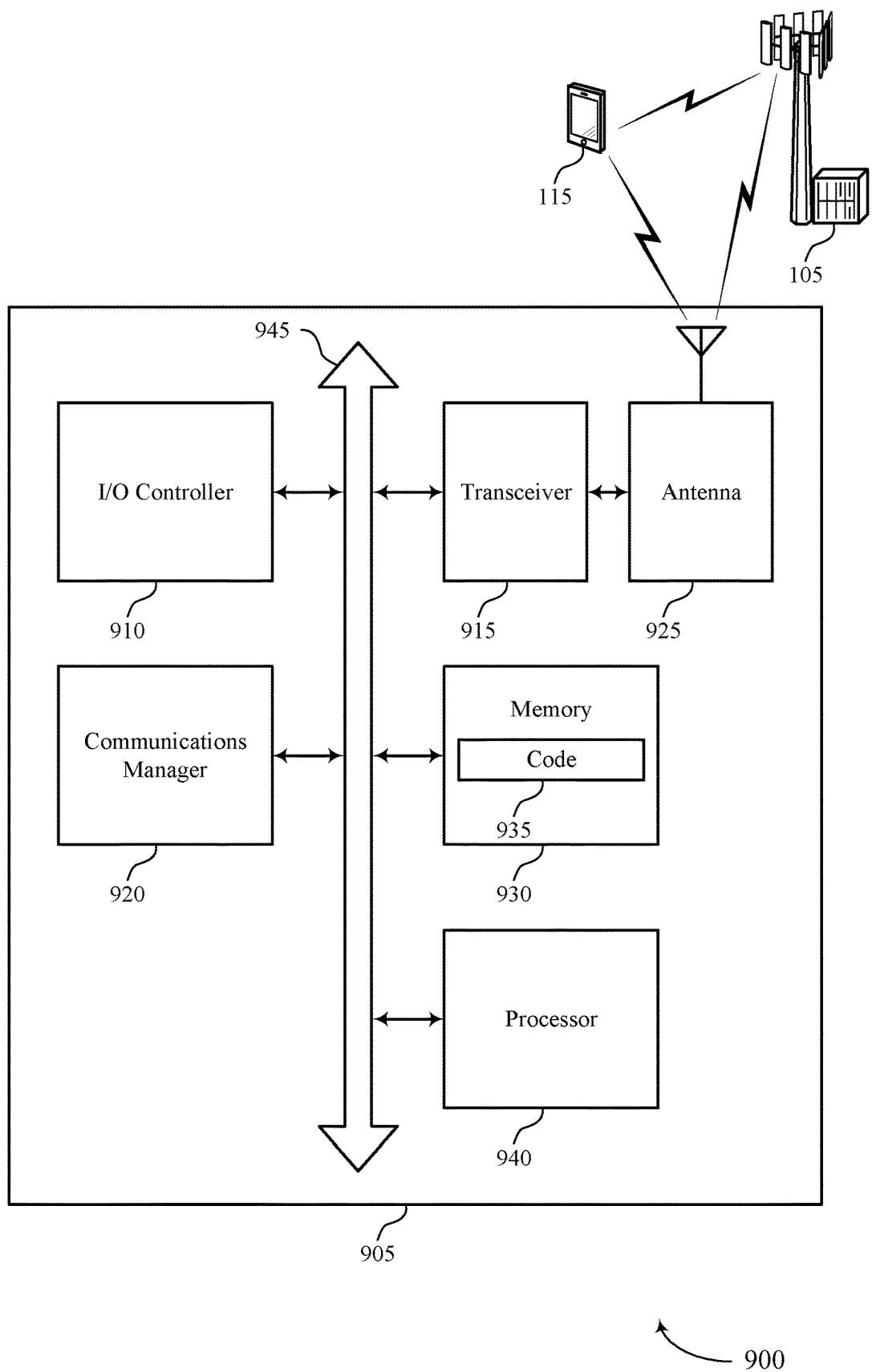
FIG. 9 shows a diagram of a system including a device that supports dynamic QCL mapping for multiple links with assistive communication nodes in accordance with aspects of the present disclosure.

FIG. 9 shows a diagram of a system 900 including a device 905 that supports dynamic QCL mapping for multiple links with assistive communication nodes in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOSR, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting dynamic QCL mapping for multiple links with assistive communication nodes). For example, the device 905 or a component of the device 905 may include a processor 940 and memory 930 coupled to the processor 940, the processor 940 and memory 930 configured to perform various functions described herein.

The communications manager 920 may support wireless communications at an assistive node in accordance with examples as disclosed herein. For example, the communications manager 920 may be configured as or otherwise support a means for receiving, at the assistive node, control signaling indicating a beam refinement procedure for associating a receive beam for communications between the assistive node and a first device via a first link with a transmit beam for communications between the assistive node and a second device via a second link. The communications manager 920 may be configured as or otherwise support a means for receiving a message from the first device over the first link using the receive beam having a first beamwidth. The communications manager 920 may be configured as or otherwise support a means for transmitting the message to the second device over the second link using the transmit beam having a second beamwidth based on the beam refinement procedure.

Additionally or alternatively, the communications manager 920 may support wireless communications at a second device in accordance with examples as disclosed herein. For example, the communications manager 920 may be configured as or otherwise support a means for receiving, from a first device or an assistive node, or both, control signaling indicating a beam refinement procedure for mapping a receive beam at the assistive node to a transmit beam at the assistive node, where the receive beam is used at the assistive node for communications between the first device and the assistive node via a first link, and the transmit beam is used at the assistive node for communications between the assistive node and the second device via a second link. The communications manager 920 may be configured as or otherwise support a means for receiving, from the assistive node, a message over the second link.

By including or configuring the communications manager 920 in accordance with examples as described herein, the device 905 may support techniques for reduced latency by utilizing efficient beamwidths for communications with an assistive node. For example, the assistive node may communicate using a narrow beam with a base station 105 for high SNR, and the assistive node may communicate with a UE 115 using a broad beam for low latency beamformed communications based to a smaller codebook for the broad beams.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of dynamic QCL mapping for multiple links with assistive communication nodes as described herein, or the processor 940 and the memory 930 may be otherwise configured to perform or support such operations.

Figure 10:
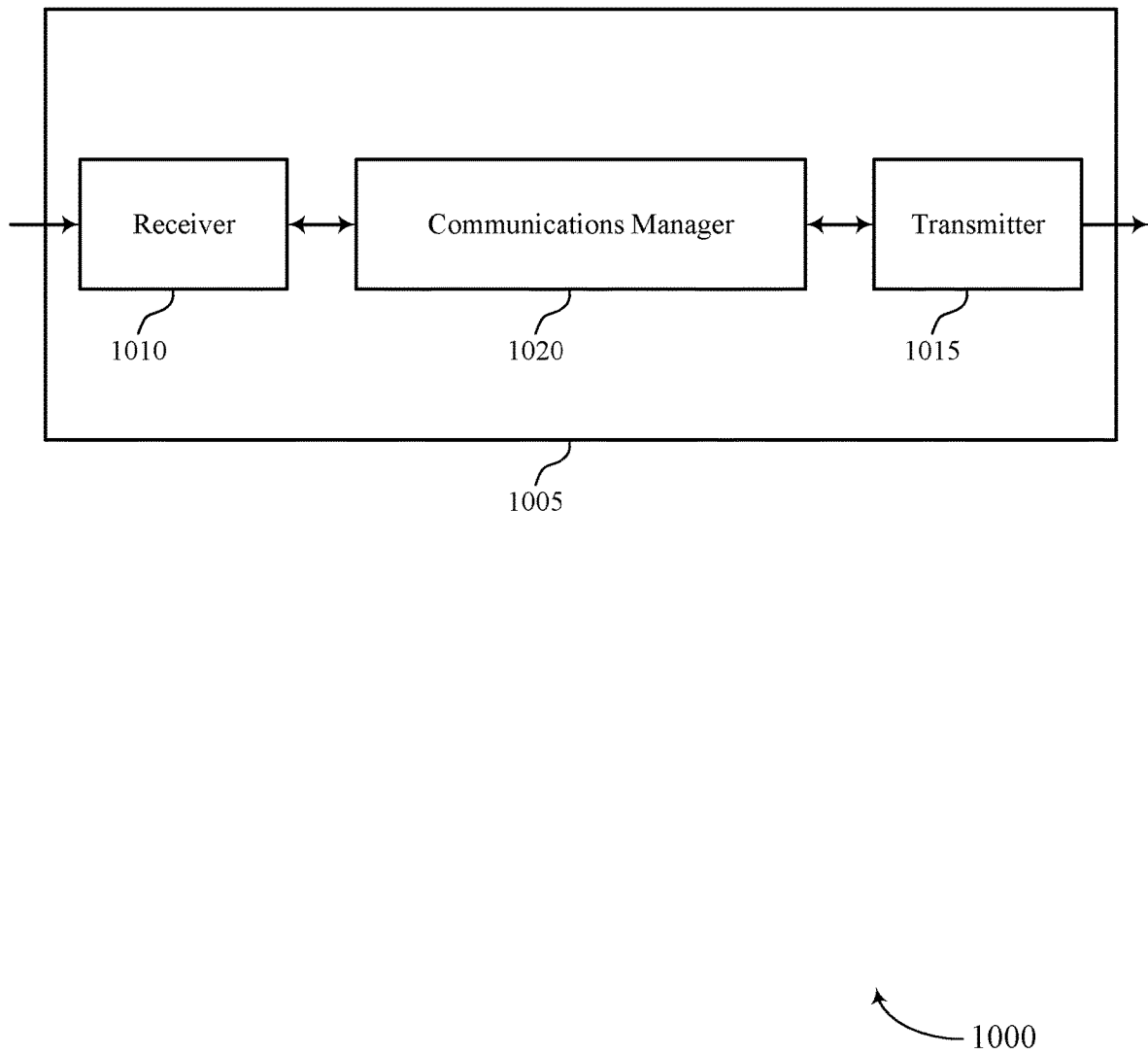
FIGS. 10 and 11 show block diagrams of devices that support dynamic QCL mapping for multiple links with assistive communication nodes in accordance with aspects of the present disclosure.

FIG. 10 shows a block diagram 1000 of a device 1005 that supports dynamic QCL mapping for multiple links with assistive communication nodes in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to dynamic QCL mapping for multiple links with assistive communication nodes). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to dynamic QCL mapping for multiple links with assistive communication nodes). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of dynamic QCL mapping for multiple links with assistive communication nodes as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a first device in accordance with examples as disclosed herein. For example, the communications manager 1020 may be configured as or otherwise support a means for transmitting, to an assistive node, control signaling indicating a beam refinement procedure for associating a receive beam at the assistive node with a transmit beam at the assistive node, where the receive beam is used at the assistive node for communications between the first device and the assistive node via a first link, and the transmit beam is used at the assistive node for communications between the assistive node and a second device via a second link. The communications manager 1020 may be configured as or otherwise support a means for transmitting a message to the assistive node over the first link based on a mapping between the receive beam at the assistive node and the transmit beam at the assistive node.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduce power consumption may improving SNR when communicating with an assistive node.

Figure 11:
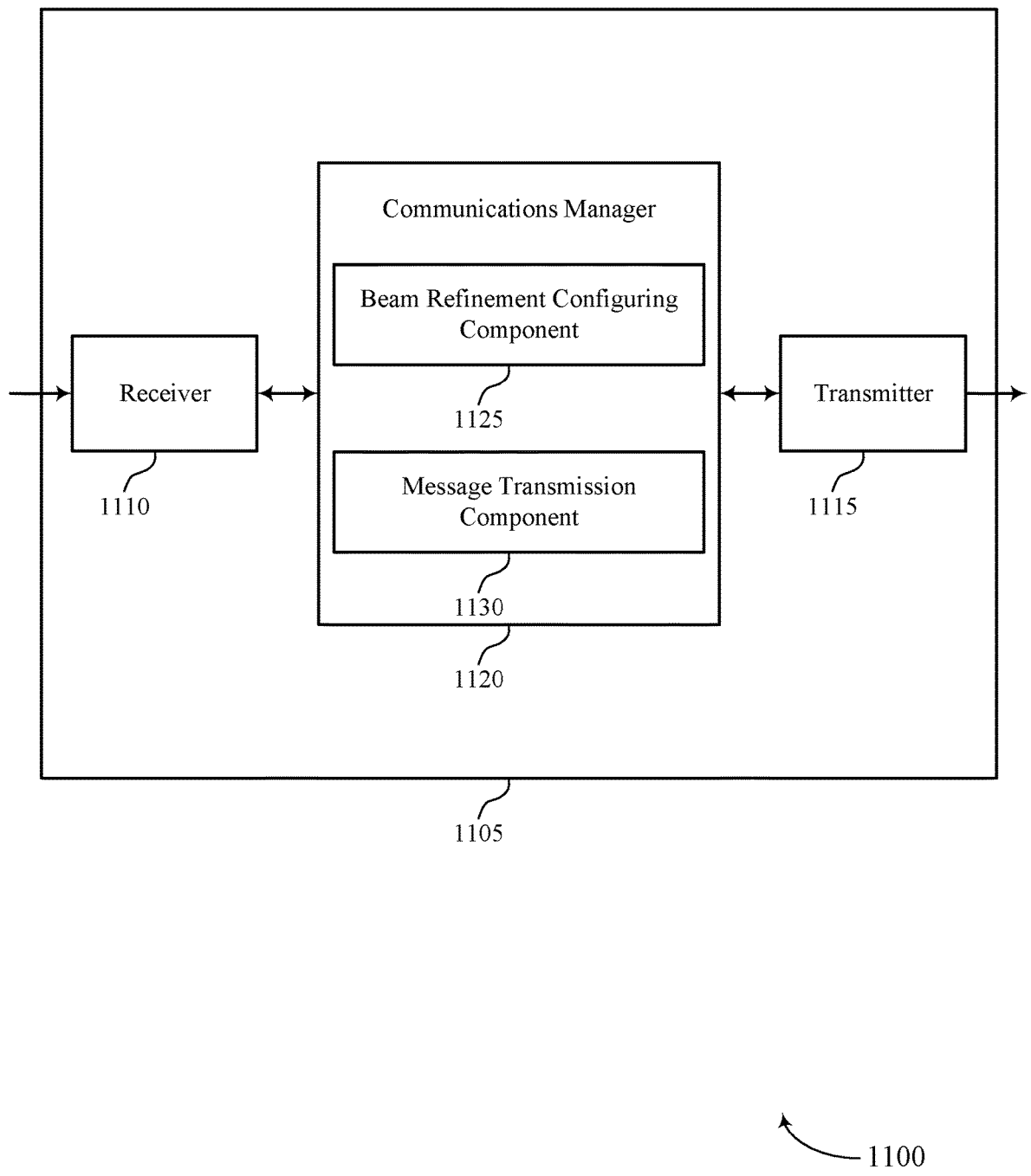

FIG. 11 shows a block diagram 1100 of a device 1105 that supports dynamic QCL mapping for multiple links with assistive communication nodes in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to dynamic QCL mapping for multiple links with assistive communication nodes). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to dynamic QCL mapping for multiple links with assistive communication nodes). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of dynamic QCL mapping for multiple links with assistive communication nodes as described herein. For example, the communications manager 1120 may include a beam refinement configuring component 1125 a message transmission component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a first device in accordance with examples as disclosed herein. The beam refinement configuring component 1125 may be configured as or otherwise support a means for transmitting, to an assistive node, control signaling indicating a beam refinement procedure for associating a receive beam at the assistive node with a transmit beam at the assistive node, where the receive beam is used at the assistive node for communications between the first device and the assistive node via a first link, and the transmit beam is used at the assistive node for communications between the assistive node and a second device via a second link. The message transmission component 1130 may be configured as or otherwise support a means for transmitting a message to the assistive node over the first link based on a mapping between the receive beam at the assistive node and the transmit beam at the assistive node.

Figure 12:
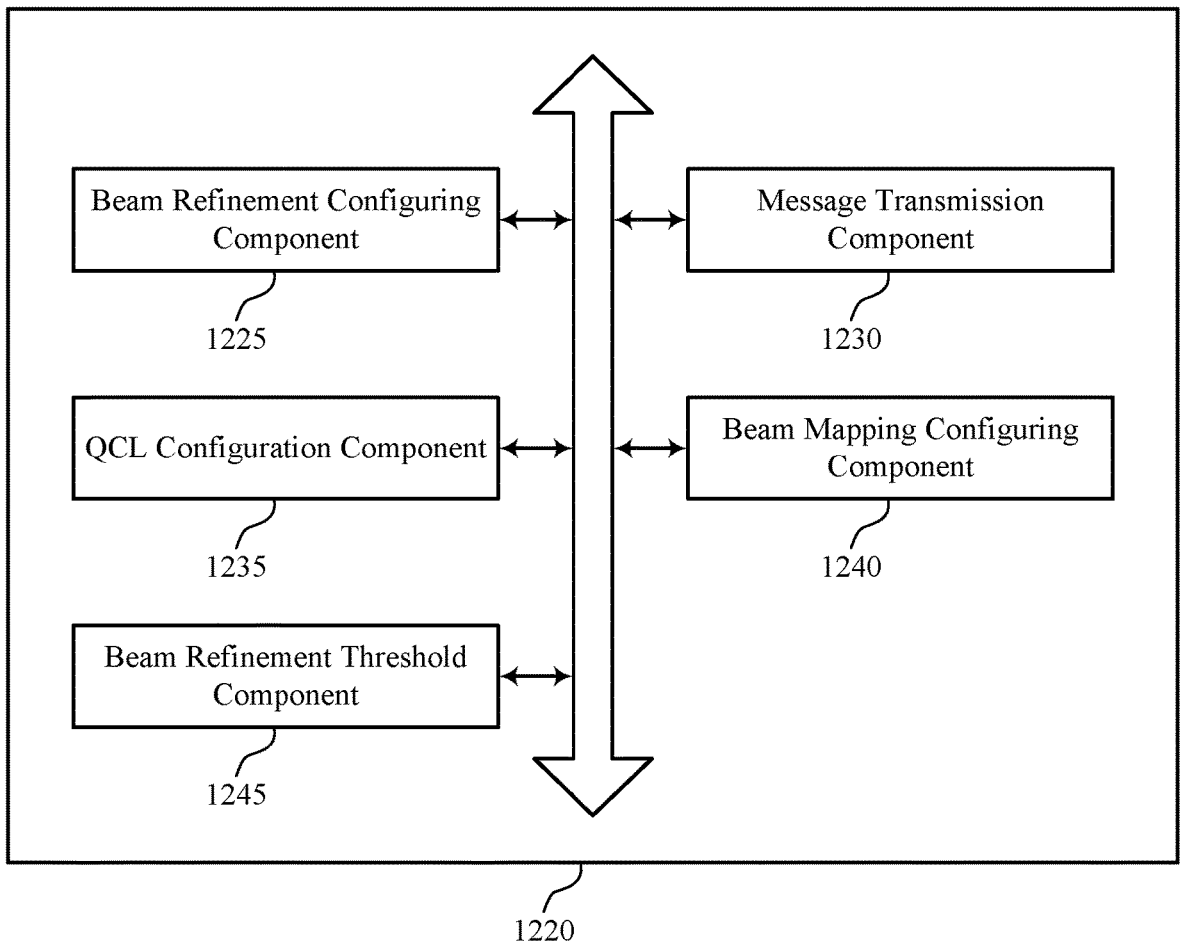
FIG. 12 shows a block diagram of a communications manager that supports dynamic QCL mapping for multiple links with assistive communication nodes in accordance with aspects of the present disclosure.

FIG. 12 shows a block diagram 1200 of a communications manager 1220 that supports dynamic QCL mapping for multiple links with assistive communication nodes in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of dynamic QCL mapping for multiple links with assistive communication nodes as described herein. For example, the communications manager 1220 may include a beam refinement configuring component 1225, a message transmission component 1230, a QCL configuration component 1235, a beam mapping configuring component 1240, a beam refinement threshold component 1245, or any combination thereof. Each of these components may communicate, directly or indirectly, with one another (e.g., via one or more buses).

The communications manager 1220 may support wireless communications at a first device in accordance with examples as disclosed herein. The beam refinement configuring component 1225 may be configured as or otherwise support a means for transmitting, to an assistive node, control signaling indicating a beam refinement procedure for associating a receive beam at the assistive node with a transmit beam at the assistive node, where the receive beam is used at the assistive node for communications between the first device and the assistive node via a first link, and the transmit beam is used at the assistive node for communications between the assistive node and a second device via a second link. The message transmission component 1230 may be configured as or otherwise support a means for transmitting a message to the assistive node over the first link based on a mapping between the receive beam at the assistive node and the transmit beam at the assistive node.

In some examples, to support transmitting the control signaling, the QCL configuration component 1235 may be configured as or otherwise support a means for transmitting an indication of a QCL association mapping a first set of one or more beams including at least the receive beam to a second set of one or more beams including at least the transmit beam.

In some examples, the QCL configuration component 1235 may be configured as or otherwise support a means for transmitting the indication of the QCL association between a reference signal transmitted by the first device to the assistive node via the first link and transmitted by the assistive node to the second device via the second link.

In some examples, to support transmitting the control signaling, the beam mapping configuring component 1240 may be configured as or otherwise support a means for transmitting, to the assistive node, the control signaling configuring the mapping between the transmit beam and the receive beam, where the transmit beamwidth is wider than the receive beamwidth.

In some examples, to support transmitting the control signaling, the beam mapping configuring component 1240 may be configured as or otherwise support a means for transmitting, to the assistive node, the control signaling configuring the mapping between the transmit beam and the receive beam, where the receive beamwidth is wider than the transmit beamwidth.

In some examples, the beam refinement threshold component 1245 may be configured as or otherwise support a means for determining a threshold for the beam refinement procedure. In some examples, the beam refinement threshold component 1245 may be configured as or otherwise support a means for transmitting an indication of the threshold to the assistive node or the second device, or both.

In some examples, to support determining the threshold, the beam refinement threshold component 1245 may be configured as or otherwise support a means for receiving, from the assistive node or the second device, or both, a request to disable the beam refinement procedure based on a signal strength of a relayed transmission of the signaling failing to satisfy the threshold.

Figure 13:
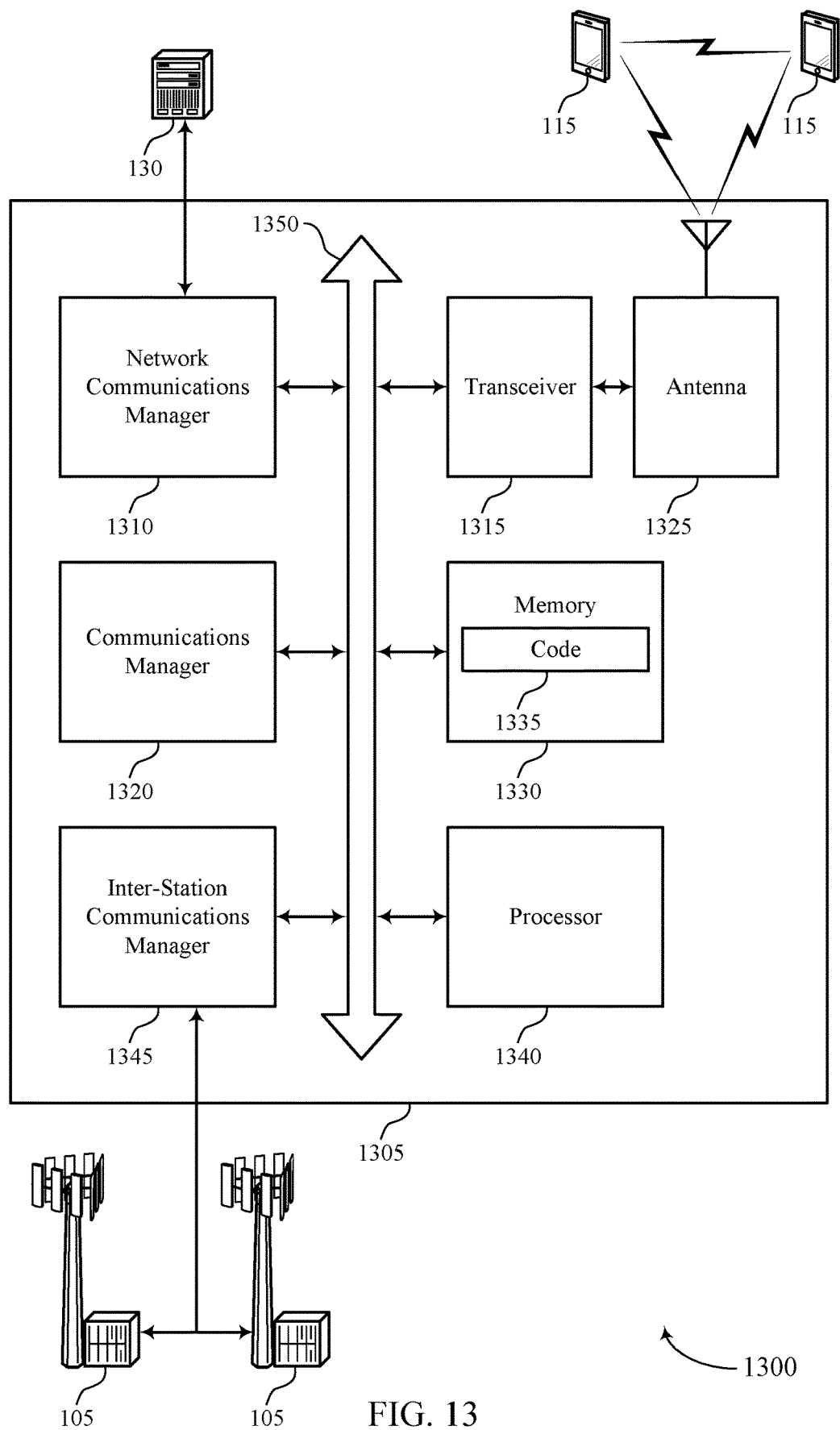
FIG. 13 shows a diagram of a system including a device that supports dynamic QCL mapping for multiple links with assistive communication nodes in accordance with aspects of the present disclosure.

FIG. 13 shows a diagram of a system 1300 including a device 1305 that supports dynamic QCL mapping for multiple links with assistive communication nodes in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory.

In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting dynamic QCL mapping for multiple links with assistive communication nodes). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a first device in accordance with examples as disclosed herein. For example, the communications manager 1320 may be configured as or otherwise support a means for transmitting, to an assistive node, control signaling indicating a beam refinement procedure for associating a receive beam at the assistive node with a transmit beam at the assistive node, where the receive beam is used at the assistive node for communications between the first device and the assistive node via a first link, and the transmit beam is used at the assistive node for communications between the assistive node and a second device via a second link. The communications manager 1320 may be configured as or otherwise support a means for transmitting a message to the assistive node over the first link based on a mapping between the receive beam at the assistive node and the transmit beam at the assistive node.

By including or configuring the communications manager 1320 in accordance with examples as described herein, the device 1305 may support techniques for reduced latency by utilizing efficient beamwidths for communications with an assistive node. For example, the assistive node may communicate using a narrow beam with a base station 105 for high SNR, and the assistive node may communicate with a UE 115 using a broad beam for low latency beamformed communications based to a smaller codebook for the broad beams.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of dynamic QCL mapping for multiple links with assistive communication nodes as described herein, or the processor 1340 and the memory 1330 may be otherwise configured to perform or support such operations.

Figure 14:
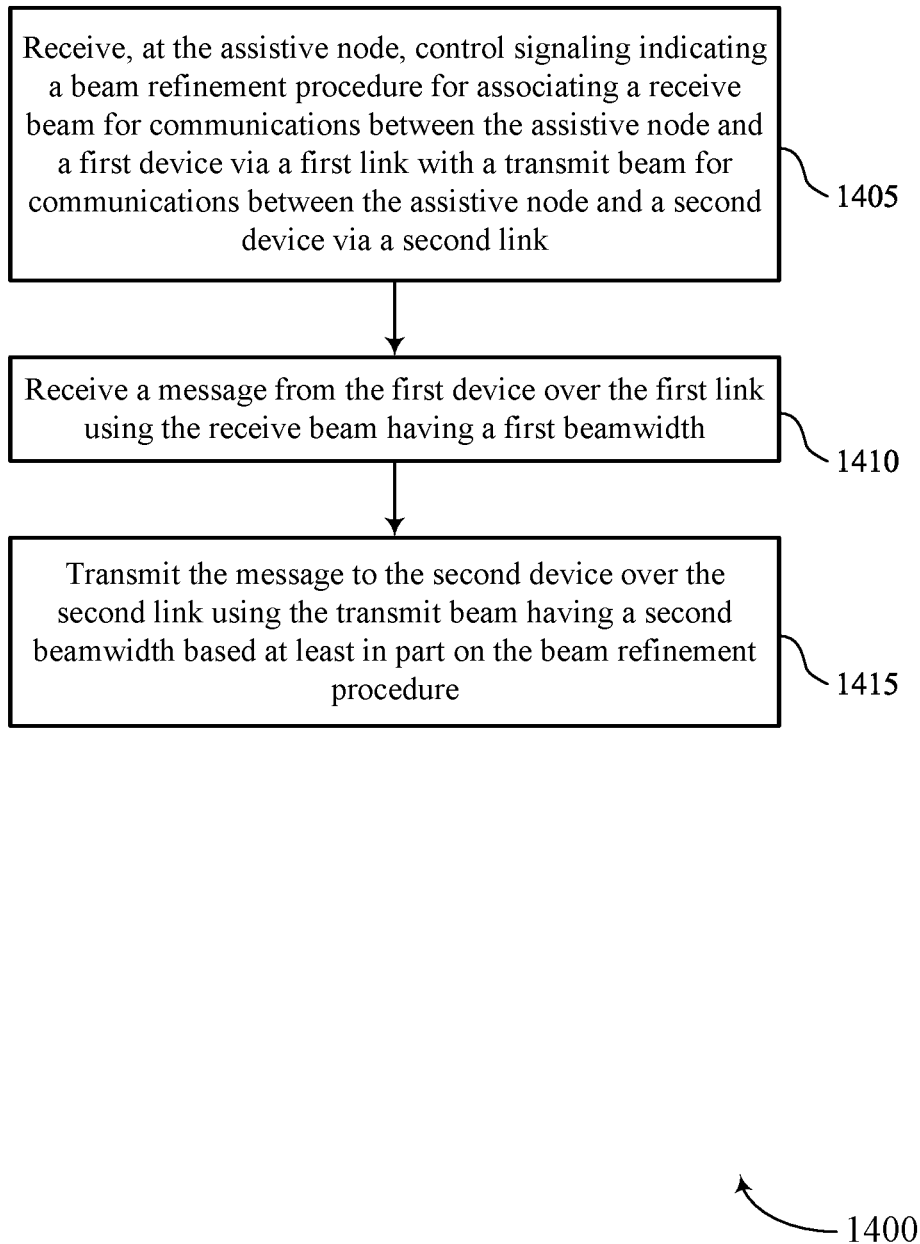
FIGS. 14 through 17 show flowcharts illustrating methods that support dynamic QCL mapping for multiple links with assistive communication nodes in accordance with aspects of the present disclosure.

FIG. 14 shows a flowchart illustrating a method 1400 that supports dynamic QCL mapping for multiple links with assistive communication nodes in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, at the assistive node, control signaling indicating a beam refinement procedure for associating a receive beam for communications between the assistive node and a first device via a first link with a transmit beam for communications between the assistive node and a second device via a second link. The operations of 1405 may be performed in accordance with examples as disclosed herein. In some examples, aspects of the operations of 1405 may be performed by a beam refinement configuration component 825 as described with reference to FIG. 8.

At 1410, the method may include receiving a message from the first device over the first link using the receive beam having a first beamwidth. The operations of 1410 may be performed in accordance with examples as disclosed herein. In some examples, aspects of the operations of 1410 may be performed by a message reception component 830 as described with reference to FIG. 8.

At 1415, the method may include transmitting the message to the second device over the second link using the transmit beam having a second beamwidth based on the beam refinement procedure. The operations of 1415 may be performed in accordance with examples as disclosed herein. In some examples, aspects of the operations of 1415 may be performed by a message relaying component 835 as described with reference to FIG. 8.

Figure 15:
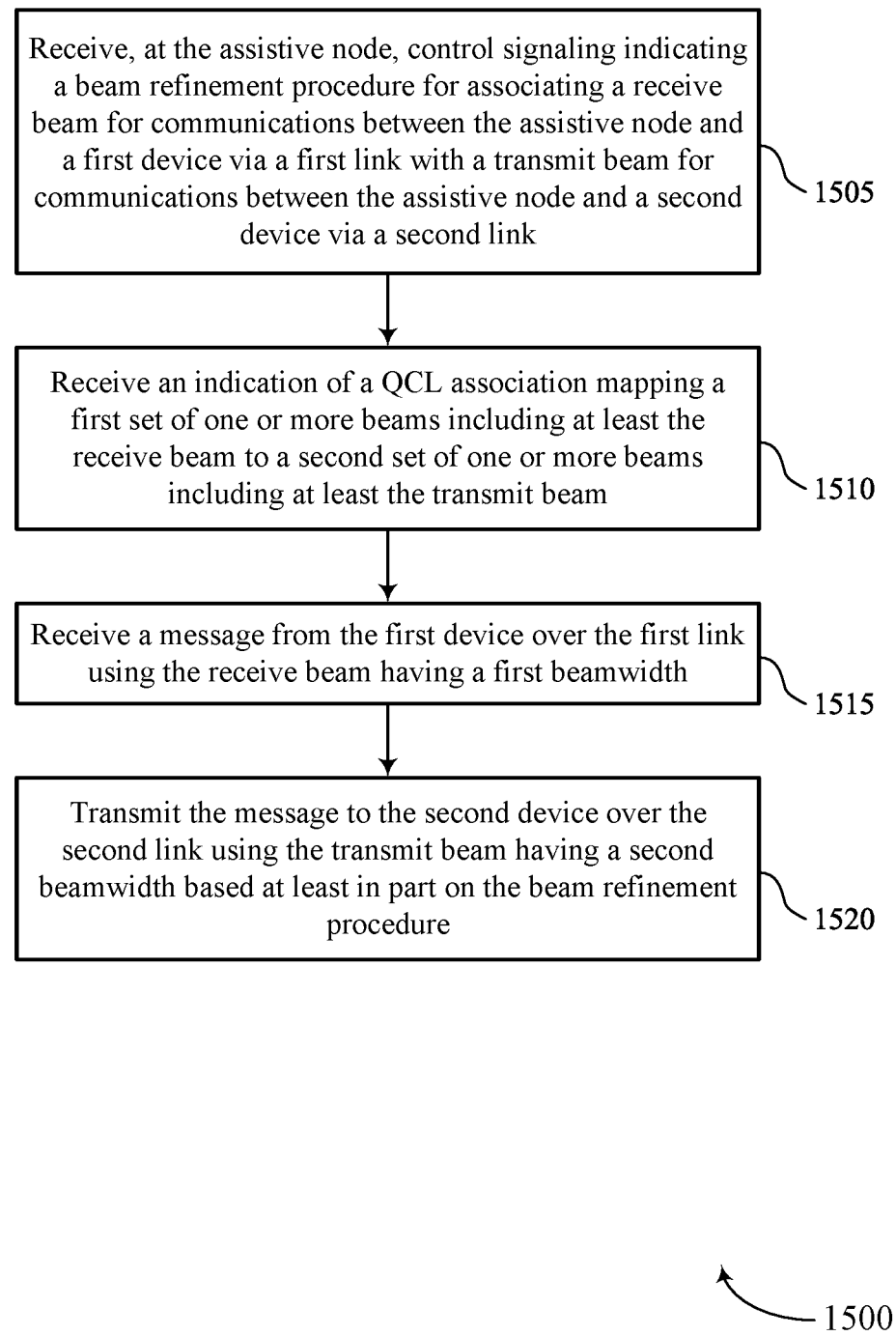

FIG. 15 shows a flowchart illustrating a method 1500 that supports dynamic QCL mapping for multiple links with assistive communication nodes in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, at the assistive node, control signaling indicating a beam refinement procedure for associating a receive beam for communications between the assistive node and a first device via a first link with a transmit beam for communications between the assistive node and a second device via a second link. The operations of 1505 may be performed in accordance with examples as disclosed herein. In some examples, aspects of the operations of 1505 may be performed by a beam refinement configuration component 825 as described with reference to FIG. 8.

At 1510, the method may include receiving an indication of a QCL association mapping a first set of one or more beams including at least the receive beam to a second set of one or more beams including at least the transmit beam. In some cases, the indication of the QCL association mapping may be included in the control signaling. The operations of 1510 may be performed in accordance with examples as disclosed herein. In some examples, aspects of the operations of 1510 may be performed by a QCL configuration component 840 as described with reference to FIG. 8.

At 1515, the method may include receiving a message from the first device over the first link using the receive beam having a first beamwidth. The operations of 1515 may be performed in accordance with examples as disclosed herein. In some examples, aspects of the operations of 1515 may be performed by a message reception component 830 as described with reference to FIG. 8.

At 1520, the method may include transmitting the message to the second device over the second link using the transmit beam having a second beamwidth based on the beam refinement procedure. The operations of 1520 may be performed in accordance with examples as disclosed herein. In some examples, aspects of the operations of 1520 may be performed by a message relaying component 835 as described with reference to FIG. 8.

Figure 16:
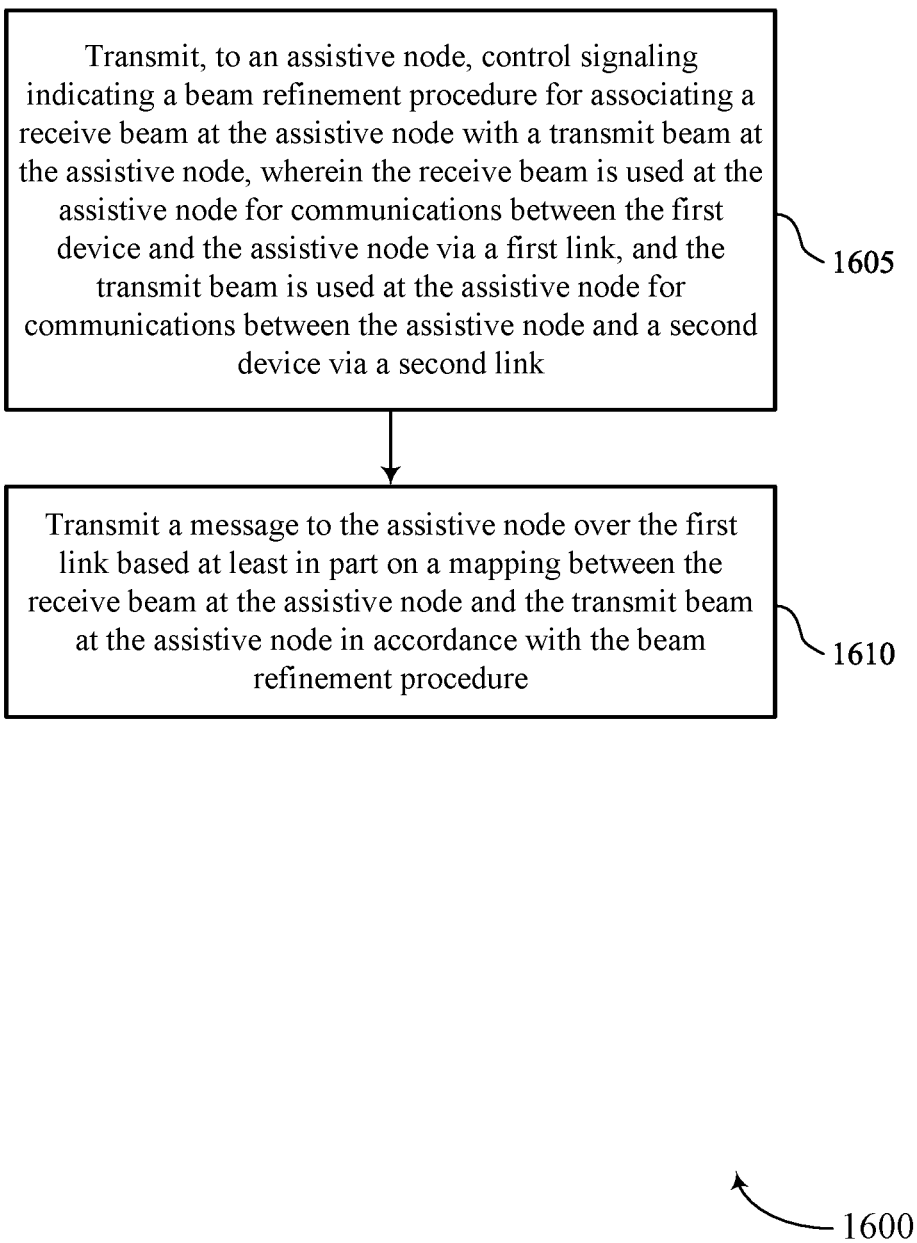

FIG. 16 shows a flowchart illustrating a method 1600 that supports dynamic QCL mapping for multiple links with assistive communication nodes in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting, to an assistive node, control signaling indicating a beam refinement procedure for associating a receive beam at the assistive node with a transmit beam at the assistive node, where the receive beam is used at the assistive node for communications between the first device and the assistive node via a first link, and the transmit beam is used at the assistive node for communications between the assistive node and a second device via a second link. The operations of 1605 may be performed in accordance with examples as disclosed herein. In some examples, aspects of the operations of 1605 may be performed by a beam refinement configuring component 1225 as described with reference to FIG. 12.

At 1610, the method may include transmitting a message to the assistive node over the first link based on a mapping between the receive beam at the assistive node and the transmit beam at the assistive node. The operations of 1610 may be performed in accordance with examples as disclosed herein. In some examples, aspects of the operations of 1610 may be performed by a message transmission component 1230 as described with reference to FIG. 12.

Figure 17:
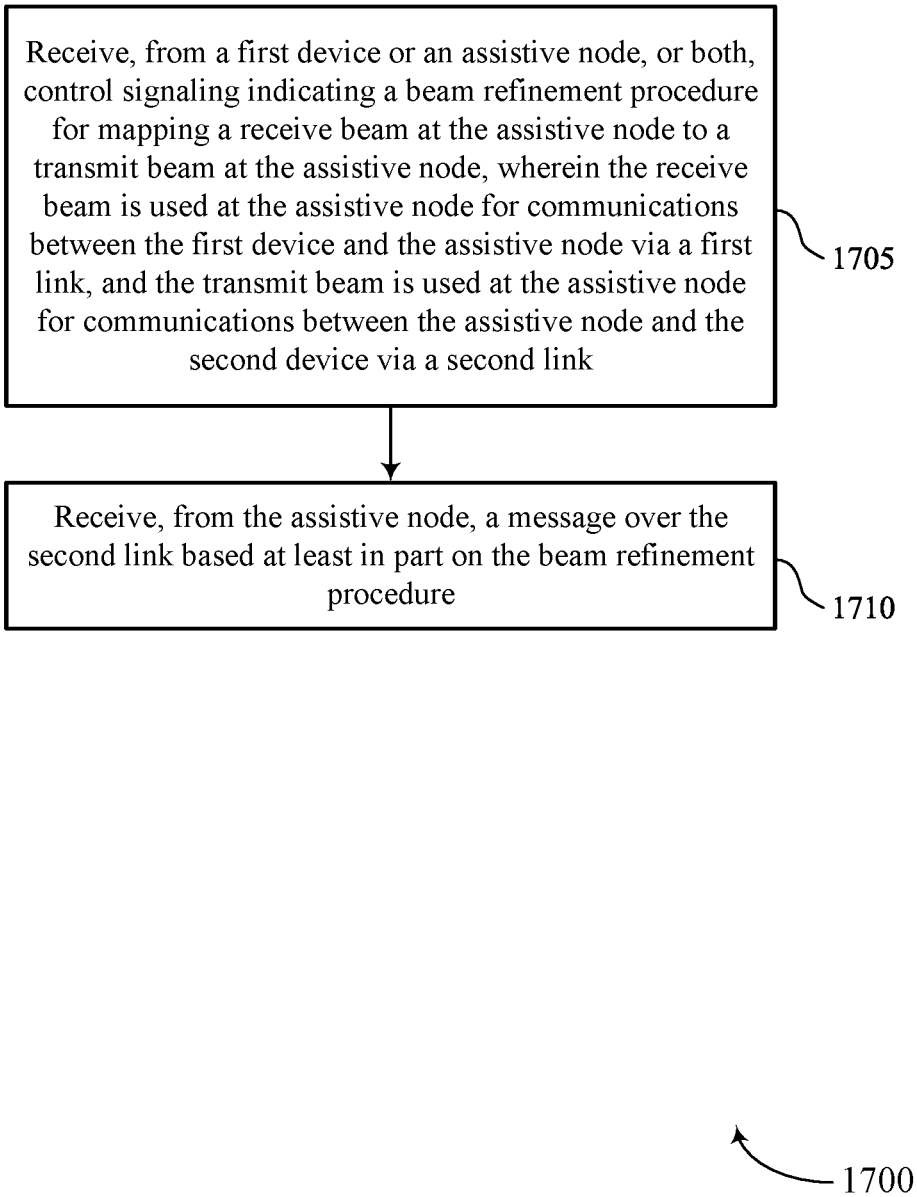

FIG. 17 shows a flowchart illustrating a method 1700 that supports dynamic QCL mapping for multiple links with assistive communication nodes in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving, from a first device or an assistive node, or both, control signaling indicating a beam refinement procedure for mapping a receive beam at the assistive node to a transmit beam at the assistive node, where the receive beam is used at the assistive node for communications between the first device and the assistive node via a first link, and the transmit beam is used at the assistive node for communications between the assistive node and the second device via a second link. The operations of 1705 may be performed in accordance with examples as disclosed herein. In some examples, aspects of the operations of 1705 may be performed by a beam refinement configuration component 825 as described with reference to FIG. 8.

At 1710, the method may include receiving, from the assistive node, a message over the second link. The operations of 1710 may be performed in accordance with examples as disclosed herein. In some examples, aspects of the operations of 1710 may be performed by a message reception component 830 as described with reference to FIG. 8.

The following provides an overview of aspects of the present disclosure:

Aspect 1: A method for wireless communications at an assistive node, comprising: receiving, at the assistive node, control signaling indicating a beam refinement procedure for associating a receive beam for communications between the assistive node and a first device via a first link with a transmit beam for communications between the assistive node and a second device via a second link; receiving a message from the first device over the first link using the receive beam having a first beamwidth; and transmitting the message to the second device over the second link using the transmit beam having a second beamwidth based at least in part on the beam refinement procedure.

Aspect 2: The method of aspect 1, wherein receiving the control signaling comprises: receiving an indication of a quasi co-location (QCL) association mapping a first set of one or more beams including at least the receive beam to a second set of one or more beams including at least the transmit beam.

Aspect 3: The method of aspect 2, further comprising: receiving the indication of the QCL association between a reference signal received using the receive beam and transmitted using the transmit beam, wherein a first parameter determined based at least in part on receiving the reference signal using the receive beam corresponds to a second parameter associated with transmitting the reference signal using the transmit beam.

Aspect 4: The method of any of aspects 1 through 3, wherein transmitting the message comprises: transmitting, to the second device, the message over the second link using the transmit beam with the second beamwidth which is wider than the first beamwidth.

Aspect 5: The method of any of aspects 1 through 4, wherein transmitting the message comprises: transmitting, to the second device, the message over the second link using the transmit beam with the second beamwidth which is narrower than the first beamwidth.

Aspect 6: The method of any of aspects 1 through 5, further comprising: receiving, from the second device over the second link, a request to disable the beam refinement procedure; and transmitting, to the first device over the first link, the request to disable the beam refinement procedure.

Aspect 7: The method of any of aspects 1 through 6, further comprising: selecting the transmit beam for the beam refinement procedure based at least in part on the control signaling indicating a mapping between the transmit beam and the receive beam.

Aspect 8: The method of any of aspects 1 through 7, wherein the message includes a data message, a control message, or one or more reference signals, or any combination thereof.

Aspect 9: The method of any of aspects 1 through 8, wherein the assistive node is an intelligent reflective surface (IRS), a reflectarray, or a relaying device.

Aspect 10: The method of any of aspects 1 through 9, wherein the first device is a base station, a transmission/reception point (TRP), or an integrated access and backhaul (IAB) node.

Aspect 11: The method of any of aspects 1 through 10, wherein the second device is a UE or a customer premises equipment (CPE).

Aspect 12: A method for wireless communications at a first device, comprising: transmitting, to an assistive node, control signaling indicating a beam refinement procedure for associating a receive beam at the assistive node with a transmit beam at the assistive node, wherein the receive beam is used at the assistive node for communications between the first device and the assistive node via a first link, and the transmit beam is used at the assistive node for communications between the assistive node and a second device via a second link; transmitting a message to the assistive node over the first link based at least in part on a mapping between the receive beam at the assistive node and the transmit beam at the assistive node.

Aspect 13: The method of aspect 12, wherein transmitting the control signaling comprises: transmitting an indication of a quasi co-location (QCL) association mapping a first set of one or more beams including at least the receive beam to a second set of one or more beams including at least the transmit beam.

Aspect 14: The method of aspect 13, further comprising: transmitting the indication of the QCL association between a reference signal transmitted by the first device to the assistive node via the first link and transmitted by the assistive node to the second device via the second link.

Aspect 15: The method of any of aspects 12 through 14, wherein transmitting the control signaling comprises: transmitting, to the assistive node, the control signaling configuring the mapping between the transmit beam and the receive beam, wherein the transmit beamwidth is wider than the receive beamwidth.

Aspect 16: The method of any of aspects 12 through 15, wherein transmitting the control signaling comprises: transmitting, to the assistive node, the control signaling configuring the mapping between the transmit beam and the receive beam, wherein the receive beamwidth is wider than the transmit beamwidth.

Aspect 17: The method of any of aspects 12 through 16, further comprising: determining a threshold for the beam refinement procedure; and transmitting an indication of the threshold to the assistive node or the second device, or both.

Aspect 18: The method of aspect 17, wherein determining the threshold comprises: receiving, from the assistive node or the second device, or both, a request to disable the beam refinement procedure based at least in part on a signal strength of a relayed transmission of the signaling failing to satisfy the threshold.

Aspect 19: A method for wireless communications at a second device, comprising: receiving, from a first device or an assistive node, or both, control signaling indicating a beam refinement procedure for mapping a receive beam at the assistive node to a transmit beam at the assistive node, wherein the receive beam is used at the assistive node for communications between the first device and the assistive node via a first link, and the transmit beam is used at the assistive node for communications between the assistive node and the second device via a second link; receiving, from the assistive node, a message over the second link.

Aspect 20: The method of aspect 19, further comprising: receiving, from the first device or the assistive node, or both, an indication of a signal strength threshold for the beam refinement procedure.

Aspect 21: The method of aspect 20, further comprising: determining a signal strength of the message does not satisfy the signal strength threshold; and transmitting, to the assistive node or the first device, or both, an indication to disable the beam refinement procedure based at least in part on the signal strength failing to satisfy the signal strength threshold.

Aspect 22: An apparatus for wireless communications at an assistive node, comprising a processor; memory coupled with the processor; and instructions stored in the memory and executable by the processor to cause the apparatus to perform a method of any of aspects 1 through 11.

Aspect 23: An apparatus for wireless communications at an assistive node, comprising at least one means for performing a method of any of aspects 1 through 11.

Aspect 24: A non-transitory computer-readable medium storing code for wireless communications at an assistive node, the code comprising instructions executable by a processor to perform a method of any of aspects 1 through 11.

Aspect 25: An apparatus for wireless communications at a first device, comprising a processor; memory coupled with the processor; and instructions stored in the memory and executable by the processor to cause the apparatus to perform a method of any of aspects 12 through 18.

Aspect 26: An apparatus for wireless communications at a first device, comprising at least one means for performing a method of any of aspects 12 through 18.

Aspect 27: A non-transitory computer-readable medium storing code for wireless communications at a first device, the code comprising instructions executable by a processor to perform a method of any of aspects 12 through 18.

Aspect 28: An apparatus for wireless communications at a second device, comprising a processor; memory coupled with the processor; and instructions stored in the memory and executable by the processor to cause the apparatus to perform a method of any of aspects 19 through 21.

Aspect 29: An apparatus for wireless communications at a second device, comprising at least one means for performing a method of any of aspects 19 through 21.

Aspect 30: A non-transitory computer-readable medium storing code for wireless communications at a second device, the code comprising instructions executable by a processor to perform a method of any of aspects 19 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

The invention claimed is:

1. An assistive node for wireless communications, comprising:
one or more memories storing processor-executable code; and
one or more processors coupled with the one or more memories and operable to execute the code to cause the assistive node to:
receive, at the assistive node, control signaling indicating a beam refinement procedure for associating a receive beam for communications between the assistive node and a first device via a first link with a transmit beam for communications between the assistive node and a second device via a second link, wherein the control signaling includes an indication of a quasi co-location (QCL) association that maps a first set of one or more beams of the first link including at least the receive beam to a second set of one or more beams of the second link including at least the transmit beam;
receive, over the first link and using the receive beam having a first beamwidth, a message from the first device that is separate from the control signaling;
select the transmit beam for the beam refinement procedure based at least in part on the control signaling indicating a mapping between the transmit beam of the second link and the receive beam of the first link according to the QCL association; and
transmit, over the second link using the transmit beam having a second beamwidth and using a passive reflecting element, the message to the second device based at least in part on the mapping between the transmit beam of the second link and the receive beam of the first link according to the QCL association,
wherein the first beamwidth is different from the second beamwidth.

2. The assistive node of claim 1, wherein:
the QCL association is between a reference signal received using the receive beam and the reference signal transmitted using the transmit beam, and wherein a first parameter determined based at least in part on receiving the reference signal using the receive beam corresponds to a second parameter associated with transmitting the reference signal using the transmit beam.

3. The assistive node of claim 1, wherein,
to transmit the message, the one or more processors are operable to execute the code to cause the assistive node to:
transmit, to the second device, the message over the second link using the transmit beam with the second beamwidth which is wider than the first beamwidth.

4. The assistive node of claim 1, wherein to transmit the message, the one or more processors are operable to execute the code to cause the assistive node to:
transmit, to the second device, the message over the second link using the transmit beam with the second beamwidth which is narrower than the first beamwidth.

5. The assistive node of claim 1, wherein the one or more processors are further operable to execute the code to cause the assistive node to:

receive, from the second device over the second link, a request to disable the beam refinement procedure; and
transmit, to the first device over the first link, the request to disable the beam refinement procedure.

6. The assistive node of claim 1, wherein the message includes a data message, a control message, or one or more reference signals, or any combination thereof.

7. The assistive node of claim 1, wherein the assistive node is an intelligent reflective surface (IRS), a reflectarray, or a relaying device.

8. The assistive node of claim 1, wherein the first device is a base station, a transmission/reception point (TRP), or an integrated access and backhaul (IAB) node.

9. The assistive node of claim 1, wherein the second device is a user equipment (UE) or a customer premises equipment (CPE).

10. A first device for wireless communications, comprising:
one or more memories storing processor-executable code; and
one or more processors coupled with the one or more memories and operable to execute the code to cause the first device to:
transmit, to an assistive node, control signaling indicating a beam refinement procedure for associating a receive beam at the assistive node with a transmit beam at the assistive node, wherein the receive beam having a first beamwidth is used at the assistive node for communications between the first device and the assistive node via a first link, and the transmit beam having a second beamwidth is used at the assistive node for communications using a passive reflecting element of the assistive node between the assistive node and a second device via a second link, wherein the control signaling includes an indication of a quasi co-location (QCL) association that indicates a mapping between a first set of one or more beams of the first link including at least the receive beam at the assistive node and a second set of one or more beams of the second link including at least the transmit beam at the assistive node; and
transmit, to the assistive node over the first link, a message that is separate from the control signaling based at least in part on the mapping between the first set of one or more beams of the first link and the second set of one or more beams of the second link,
wherein the first beamwidth is different from the second beamwidth.

11. The first device of claim 10, wherein the QCL association is between a reference signal transmitted by the first device to the assistive node via the first link and the reference signal transmitted by the assistive node to the second device via the second link.

12. The first device of claim 10, wherein the first beamwidth is wider than the second beamwidth.

13. The first device of claim 10, wherein the first beamwidth is narrower than the second beamwidth.

14. The first device of claim 10, wherein the one or more processors are further operable to execute the code to cause the first device to:
determine a threshold for the beam refinement procedure; and
transmit an indication of the threshold to the assistive node or the second device, or both.

15. The first device of claim 14, wherein the one or more processors are further operable to execute the code to cause the first device to:

receive, from the assistive node or the second device, or both, a request to disable the beam refinement procedure based at least in part on a signal strength of a relayed transmission of the control signaling failing to satisfy the threshold.

16. A second device for wireless communications, comprising:
one or more memories storing processor-executable code; and
one or more processors coupled with the one or more memories and operable to execute the code to cause the second device to:
receive, from a first device or an assistive node, or both, control signaling indicating a beam refinement procedure for mapping a receive beam at the assistive node to a transmit beam at the assistive node, wherein the receive beam is used at the assistive node for communications between the first device and the assistive node via a first link, and the transmit beam is used at the assistive node for communications between the assistive node and the second device via a second link;
receive, from the assistive node, a message over the second link; and
transmit, to the assistive node or the first device, or both, an indication to disable the beam refinement procedure based at least in part on a determination that a signal strength of the message fails to satisfy a signal strength threshold.

17. The second device of claim 16, wherein the one or more processors are further operable to execute the code to cause the second device to:
receive, from the first device or the assistive node, or both, an indication of a signal strength threshold for the beam refinement procedure.

18. A method for wireless communications at an assistive node, comprising:
receiving, at the assistive node, control signaling indicating a beam refinement procedure for associating a receive beam for communications between the assistive node and a first device via a first link with a transmit beam for communications between the assistive node and a second device via a second link, wherein the control signaling includes an indication of a quasi co-location (QCL) association that maps a first set of one or more beams of the first link including at least the receive beam to a second set of one or more beams of the second link including at least the transmit beam;
receiving, over the first link and using the receive beam having a first beamwidth, a message from the first device that is separate from the control signaling;
selecting the transmit beam for the beam refinement procedure based at least in part on the control signaling indicating a mapping between the transmit beam of the second link and the receive beam of the first link according to the QCL association; and
transmitting, over the second link using the transmit beam having a second beamwidth and using a passive reflecting element, the message to the second device based at least in part on the mapping between the transmit beam of the second link and the receive beam of the first link according to the QCL association,
wherein the first beamwidth is different from the second beamwidth.

19. The method of claim 18, wherein the QCL association is between a reference signal received using the receive beam and the reference signal transmitted using the transmit beam, and wherein a first parameter determined based at least in part on receiving the reference signal using the receive beam corresponds to a second parameter associated with transmitting the reference signal using the transmit beam.

20. The method of claim 18, wherein transmitting the message comprises:
transmitting, to the second device, the message over the second link using the transmit beam with the second beamwidth which is wider than the first beamwidth.

21. The method of claim 18, wherein transmitting the message comprises:
transmitting, to the second device, the message over the second link using the transmit beam with the second beamwidth which is narrower than the first beamwidth.

22. The method of claim 18, further comprising:
receiving, from the second device over the second link, a request to disable the beam refinement procedure; and
transmitting, to the first device over the first link, the request to disable the beam refinement procedure.

23. The method of claim 18, wherein the assistive node is an intelligent reflective surface (IRS), a reflectarray, or a relaying device, wherein the first device is a base station, a transmission/reception point (TRP), or an integrated access and backhaul (IAB) node, and wherein the second device is a user equipment (UE) or a customer premises equipment (CPE).

* * * * *